(12) United States Patent
Whitcomb et al.

(10) Patent No.: US 9,017,449 B2
(45) Date of Patent: *Apr. 28, 2015

(54) NANOWIRE PREPARATION METHODS, COMPOSITIONS, AND ARTICLES

(75) Inventors: David R. Whitcomb, Woodbury, MN (US); William D. Ramsden, Afton, MN (US); Doreen C. Lynch, Afton, MN (US)

(73) Assignee: Carestream Health, Inc., Rochester, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 13/289,065

(22) Filed: Nov. 4, 2011

(65) Prior Publication Data

US 2012/0148436 A1 Jun. 14, 2012

Related U.S. Application Data

(60) Provisional application No. 61/421,294, filed on Dec. 9, 2010, provisional application No. 61/423,744, filed on Dec. 16, 2010, provisional application No. 61/488,824, filed on May 23, 2011, provisional (Continued)

(51) Int. Cl.
| | |
|---|---|
| *B22F 9/24* | (2006.01) |
| *B82B 3/00* | (2006.01) |
| *C22C 5/06* | (2006.01) |
| *B22F 1/00* | (2006.01) |
| *B82Y 30/00* | (2011.01) |
| *B82Y 40/00* | (2011.01) |
| *C22C 1/04* | (2006.01) |

(52) U.S. Cl.
CPC ............. *B22F 1/0025* (2013.01); *B22F 9/24* (2013.01); *B22F 2998/00* (2013.01); *B82Y 30/00* (2013.01); *B82Y 40/00* (2013.01); *C22C 1/0466* (2013.01); *C22C 5/06* (2013.01)

(58) Field of Classification Search
CPC .... B22F 9/24; B22F 1/0025; B22F 2009/245; B22F 2301/255; B22F 1/0018; C22C 5/06; H01B 5/14
USPC ............................................... 75/371
See application file for complete search history.

(56) References Cited

U.S. PATENT DOCUMENTS 3,833,410 A * 9/1974 Ang et al. ............... 428/333
7,749,299 B2 * 7/2010 Vanheusden et al. ......... 75/362

(Continued)

FOREIGN PATENT DOCUMENTS

| CN | 101157140 A | 4/2008 |
|---|---|---|
| CN | 101244459 A | 8/2008 |

(Continued)

OTHER PUBLICATIONS http://en.wikipedia.org/wiki/Tungsten_chloride (Jan. 7, 2009).*

(Continued)

*Primary Examiner* — Jie Yang
*Assistant Examiner* — Xiaowei Su
(74) *Attorney, Agent, or Firm* — Reed L. Christiansen

(57) ABSTRACT

Nanomaterial preparation methods, compositions, and articles are disclosed and claimed. Such methods can provide nanomaterials with improved morphologies relative to previous methods. Such materials are useful in electronic applications.

8 Claims, 21 Drawing Sheets

Related U.S. Application Data application No. 61/488,834, filed on May 23, 2011, provisional application No. 61/488,840, filed on May 23, 2011, provisional application No. 61/488,880, filed on May 23, 2011, provisional application No. 61/488,945, filed on May 23, 2011, provisional application No. 61/488,977, filed on May 23, 2011, provisional application No. 61/488,983, filed on May 23, 2011, provisional application No. 61/494,072, filed on Jun. 7, 2011, provisional application No. 61/522,741, filed on Aug. 12, 2011, provisional application No. 61/523,977, filed on Aug. 16, 2011, provisional application No. 61/523,987, filed on Aug. 16, 2011.

(56) References Cited

U.S. PATENT DOCUMENTS

| | | | |
|---|---|---|---|
| 8,551,211 B2* | 10/2013 | Oilmann et al. | 75/371 |
| 2009/0004445 A1* | 1/2009 | Park et al. | 428/207 |
| 2009/0196788 A1* | 8/2009 | Wang et al. | 420/501 |
| 2012/0128529 A1* | 5/2012 | Whitcomb et al. | 420/591 |
| 2012/0297927 A1* | 11/2012 | Whitcomb | 75/343 |

FOREIGN PATENT DOCUMENTS

| | | |
|---|---|---|
| CN | 101934377 | 9/2010 |
| CN | 102029400 | 11/2010 |
| EP | 1 918 046 B1 | 4/2012 |

OTHER PUBLICATIONS

Tang et al. Syntheses of silver nanowires in liquid phase, Nanowires Science and Technology, Feb. 2010, p. 25-42.*

Sun et al. Crystalline silver nanowires by soft solution processing, Nano Letters, 2002, vol. 2, p. 165-168.*

Standard Reduction Potentials, Process Principles in Minerals and Materials Production 3rd ed. Edited by P. C. Hayes Brisbane, Queensland, Australia: Hayes Publishing co, 2003.*

Y. Xia et al., "Shape-Controlled Synthesis of Metal Nanocrystals: Simple Chemistry Meets Complex Physics?", Nanostructures, Angew. Chem. Int. Ed., 2009, vol. 48, pp. 60-103.

J. Jiu et al., "Preparation of Ag nanorods with high yield by polyol process", Materials Chemistry and Physics, vol. 114, 2009, pp. 333-338.

S. Nandikonda, "Microwave Assisted Synthesis of Silver Nanorods", Auburn, Alabama, Aug. 9, 2010, 59 pages.

S. Nandikonda et al., "Effects of Salt Selection on the Rapid Synthesis of Silver Nanowires", Abstract INOR0299, $240^{th}$ ACS National Meeting, Boston, MA, Aug. 22-27, 2010, 1 page.

Y.C. Lu et al., "Tailoring of silver wires and their performance as transparent conductive coatings", Nanotechnology, vol. 21, 2010, 215707, pp. 1-6.

International Search Report, International Application No. PCT/US2011/059473, dated Apr. 3, 2013, 2 pages.

Accounts of Chemical Research, Synthesis of Silver Nanostructures with Controlled Shapes and Properties, Benjamin Wiley et al., vol. 40, No. 10, 2007, pp. 1067-1076.

* cited by examiner

NANOWIRE PREPARATION METHODS, COMPOSITIONS, AND ARTICLES

CROSS REFERENCE TO RELATED APPLICATIONS

This application claims the benefit of U.S. Provisional Application No. 61/421,294, filed Dec. 9, 2010, entitled METAL ION CATALYSIS OF METAL ION REDUCTION, METHODS, COMPOSITIONS, AND ARTICLES; U.S. Provisional Application No. 61/423,744, filed Dec. 16, 2010, entitled METAL ION CATALYSIS OF METAL ION REDUCTION, METHODS, COMPOSITIONS, AND ARTICLES; U.S. Provisional Application No. 61/488,824, filed May 23, 2011, entitled NANOWIRE PREPARATION METHODS, COMPOSITIONS, AND ARTICLES; U.S. Provisional Application No. 61/488,834, filed May 23, 2011, entitled METAL ION CATALYSIS OF METAL ION REDUCTION, METHODS, COMPOSITIONS, AND ARTICLES; U.S. Provisional Application No. 61/488,840, filed May 23, 2011, entitled METAL ION CATALYSIS OF METAL ION REDUCTION, METHODS, COMPOSITIONS, AND ARTICLES; U.S. Provisional Application No. 61/488,880, filed May 23, 2011, entitled METAL ION CATALYSIS OF METAL ION REDUCTION, METHODS, COMPOSITIONS, AND ARTICLES; U.S. Provisional Application No. 61/488,945, filed May 23, 2011, entitled NANOWIRE PREPARATION METHODS, COMPOSITIONS, AND ARTICLES; U.S. Provisional Application No. 61/488,977, filed May 23, 2011, entitled NANOWIRE PREPARATION METHODS, COMPOSITIONS, AND ARTICLES; U.S. Provisional Application No. 61/488,983, filed May 23, 2011, entitled NANOWIRE PREPARATION METHODS, COMPOSITIONS, AND ARTICLES; U.S. Provisional Application No. 61/494,072, filed Jun. 7, 2011, entitled NANOWIRE PREPARATION METHODS, COMPOSITIONS, AND ARTICLES; U.S. Provisional Application No. 61/522,741, filed Aug. 12, 2011, entitled NANOWIRE PREPARATION METHODS, COMPOSITIONS, AND ARTICLES; U.S. Provisional Application No. 61/523,977, filed Aug. 16, 2011, entitled NANOWIRE PREPARATION METHODS, COMPOSITIONS, AND ARTICLES; and U.S. Provisional Application No. 61/523,987, filed Aug. 16, 2011, entitled NANOWIRE PREPARATION METHODS, COMPOSITIONS, AND ARTICLES, each of which is hereby incorporated by reference in its entirety.

BACKGROUND

The general preparation of silver nanowires (10-200 aspect ratio) is known. See, for example, *Angew. Chem. Int. Ed.* 2009, 48, 60, Y. Xia, Y. Xiong, B. Lim, S. E. Skrabalak, which is hereby incorporated by reference in its entirety. Such preparations typically employ $Fe^{2+}$ or $Cu^{2+}$ ions to "catalyze" the wire formation over other morphologies. The controlled preparation of silver nanowires having the desired lengths and widths, however, is not known. For example, the $Fe^{2+}$ produces a wide variety of lengths or thicknesses and the $Cu^{2+}$ produces wires that are too thick for many applications.

The metal ions used to catalyze wire formation are generally primarily reported to be provided as a metal halide salt, usually as a metal chloride, for example, $FeCl_2$ or $CuCl_2$. See, for example, J. Jiu, K. Murai, D. Kim, K. Kim, K. Suganuma, *Mat. Chem. & Phys.*, 2009, 114, 333, which refers to NaCl, $CoCl_2$, $CuCl_2$, $NiCl_2$ and $ZnCl_2$; Japanese patent application publication JP2009155674, which describes $SnCl_4$; S. Nandikonda, "Microwave Assisted Synthesis of Silver Nanorods," M. S. Thesis, Auburn University, Aug. 9, 2010, which refers to NaCl, KCl, $MgCl_2$, $CaCl_2$, $MnCl_2$, $CuCl_2$, and $FeCl_3$; S. Nandikonda and E. W. Davis, "Effects of Salt Selection on the Rapid Synthesis of Silver Nanowires," Abstract INOR-299, 240th ACS National Meeting, Boston, Mass., Aug. 22-27, 2010, which discloses NaCl, KCl, $MgCl_2$, $CaCl_2$, $MnCl_2$, $CuCl_2$, $FeCl_3$, $Na_2S$, and NaI; Chinese patent application publication CN101934377, which discloses $Mn^{2+}$; Y. C. Lu, K. S. Chou, *Nanotech.*, 2010, 21, 215707, which discloses $Pd^{2+}$; and Chinese patent application publication CN102029400, which discloses NaCl, $MnCl_2$, and $Na_2S$.

SUMMARY

At least some embodiments provide methods comprising providing at least one composition comprising at least one first reducible metal ion and at least one second metal or metal ion comprising at least one element or ion of an element from IUPAC Group 3, IUPAC Group 4, IUPAC Group 5, IUPAC Group 6, or IUPAC Group 7, the at least one second metal or metal ion differing in atomic number from the at least one first reducible metal ion; and reducing the at least one first reducible metal ion to at least one first metal.

In at least some cases, the at least one first reducible metal ion may, for example, comprise one or more of at least one coinage metal ion, at least one ion of an element from IUPAC Group 11, or at least one silver ion.

In at least some embodiments, the at least one composition may comprise at least one metal oxide compound comprising the at least one second metal or metal ion. Such metal oxide compounds may, for example, comprise at least one of a metal oxide halide compound or a transition metal oxide compound. In at least some cases, the at least one second metal or metal ion may comprise an oxidation state of +4 or greater.

The at least one second metal or metal ion may, in some cases, comprise at least one element or ion of an element from IUPAC Group 3, or at least one element from IUPAC Group 4, or at least one element or ion of an element from IUPAC Group 5, or at least one element or ion of an element from IUPAC Group 6, or at least one element or ion of an element from IUPAC Group 7. The at least one second metal or metal ion may, in other cases, comprise elements or ions of elements from more than one of IUPAC Groups 4, 5, 6, or 7.

Other embodiments provide the at least one first metal produced according to such methods.

Still other embodiments provide metal nanowires comprising the at least one first metal produced according to such methods. In some cases, such metal nanowires may, for example, comprise an aspect ratio between about 50 and about 10,000. Such nanowires may, for example, comprise an average diameter of between about 10 nm and about 300 nm, or of between about 25 nm and about 60 nm, or of between about 60 nm and about 140 nm, or of between about 140 nm and about 260 nm. In some cases, such metal nanowires may comprise at least one silver nanowire.

Yet still other embodiments provide articles comprising the at least one first metal produced according to such methods. Such articles may, for example, comprise one or more of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

These embodiments and other variations and modifications may be better understood from the brief description of figures, description, exemplary embodiments, examples, figures, and claims that follow. Any embodiments provided are given only by way of illustrative example. Other desirable objectives and advantages inherently achieved may occur or become apparent to those skilled in the art. The invention is defined by the appended claims.

DESCRIPTION

Figure 1:
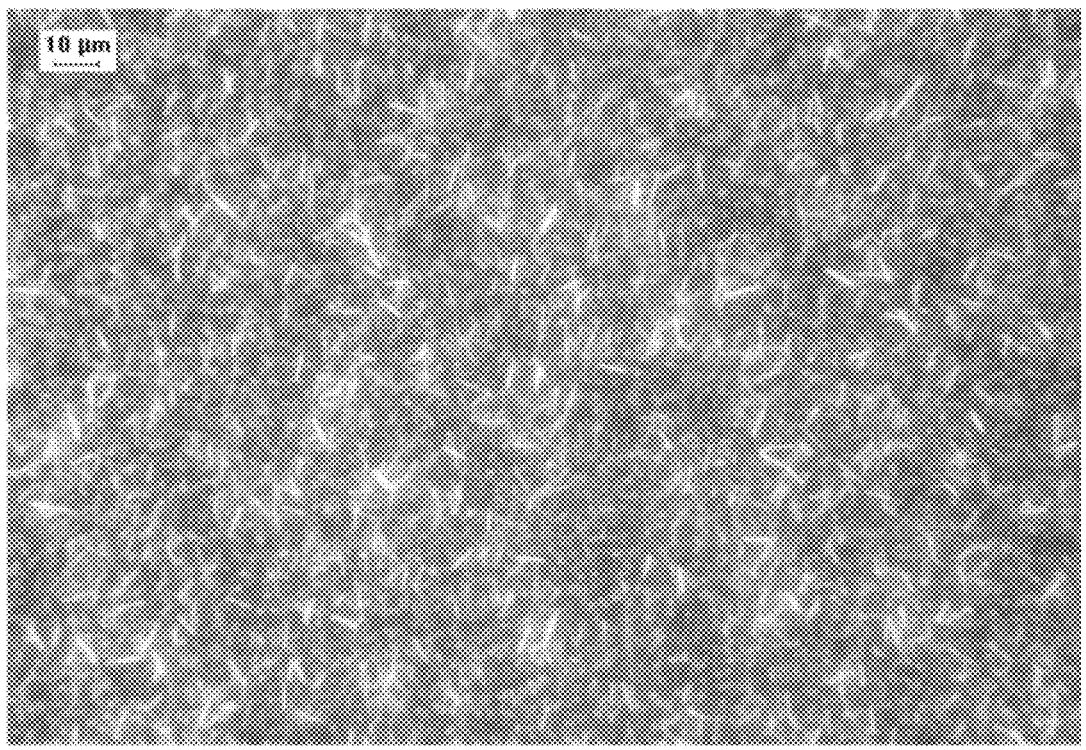
FIG. 1 shows an optical micrograph of the silver nanowire product of Example 1.

All publications, patents, and patent documents referred to in this document are incorporated by reference herein in their entirety, as though individually incorporated by reference.

U.S. Provisional Application No. 61/421,294, filed Dec. 9, 2010, entitled METAL ION CATALYSIS OF METAL ION REDUCTION, METHODS, COMPOSITIONS, AND ARTICLES; U.S. Provisional Application No. 61/423,744, filed Dec. 16, 2010, entitled METAL ION CATALYSIS OF METAL ION REDUCTION, METHODS, COMPOSITIONS, AND ARTICLES; U.S. Provisional Application No. 61/488,824, filed May 23, 2011, entitled NANOWIRE PREPARATION METHODS, COMPOSITIONS, AND ARTICLES; U.S. Provisional Application No. 61/488,834, filed May 23, 2011, entitled METAL ION CATALYSIS OF METAL ION REDUCTION, METHODS, COMPOSITIONS, AND ARTICLES; U.S. Provisional Application No. 61/488,840, filed May 23, 2011, entitled METAL ION CATALYSIS OF METAL ION REDUCTION, METHODS, COMPOSITIONS, AND ARTICLES; U.S. Provisional Application No. 61/488,880, filed May 23, 2011, entitled METAL ION CATALYSIS OF METAL ION REDUCTION, METHODS, COMPOSITIONS, AND ARTICLES; U.S. Provisional Application No. 61/488,945, filed May 23, 2011, entitled NANOWIRE PREPARATION METHODS, COMPOSITIONS, AND ARTICLES; U.S. Provisional Application No. 61/488,977, filed May 23, 2011, entitled NANOWIRE PREPARATION METHODS, COMPOSITIONS, AND ARTICLES; U.S. Provisional Application No. 61/488,983, filed May 23, 2011, entitled NANOWIRE PREPARATION METHODS, COMPOSITIONS, AND ARTICLES; U.S. Provisional Application No. 61/494,072, filed Jun. 7, 2011, entitled NANOWIRE PREPARATION METHODS, COMPOSITIONS, AND ARTICLES; U.S. Provisional Application No. 61/522,741, filed Aug. 12, 2011, entitled NANOWIRE PREPARATION METHODS, COMPOSITIONS, AND ARTICLES; U.S. Provisional Application No. 61/523,977, filed Aug. 16, 2011, entitled NANOWIRE PREPARATION METHODS, COMPOSITIONS, AND ARTICLES; and U.S. Provisional Application No. 61/523,987, filed Aug. 16, 2011, entitled NANOWIRE PREPARATION METHODS, COMPOSITIONS, AND ARTICLES, are each hereby incorporated by reference in their entirety.

Reducible Metal Ions and Metal Products

Some embodiments provide methods comprising reducing at least one reducible metal ion to at least one metal. A reducible metal ion is a cation that is capable of being reduced to a metal under some set of reaction conditions. In such methods, the at least one first reducible metal ion may, for example, comprise at least one coinage metal ion. A coinage metal ion is an ion of one of the coinage metals, which include copper, silver, and gold. Or such a reducible metal ion may, for example, comprise at least one ion of an IUPAC Group 11 element. An exemplary reducible metal ion is a silver cation. Such reducible metal ions may, in some cases, be provided as salts. For example, silver cations might, for example, be provided as silver nitrate.

In such embodiments, the at least one metal is that metal to which the at least one reducible metal ion is capable of being reduced. For example, silver would be the metal to which a silver cation would be capable of being reduced.

These methods are also believed to be applicable to reducible metal cations other than silver cations, including, for example reducible cations of other IUPAC Group 11 elements, reducible cations of other coinage metals, and the like. These methods may also be used to prepare products other than nanowires, such as, for example, nanocubes, nanorods, nanopyramids, nanotubes, and the like. Such products may be incorporated into articles, such as, for example, transparent electrodes, solar cells, light emitting diodes, other electronic devices, medical imaging devices, medical imaging media, and the like.

Metal or Metal Ion from IUPAC Groups 3, 4, 5, 6, or 7

In some embodiments, the at least one reducible metal ion is reduced in the presence of at least one second metal or metal ion comprising at least one metal or metal ion from IUPAC Groups 3, 4, 5, 6, or 7. The at least one second metal or metal ion may, in some cases, comprise at least one element or ion of an element from IUPAC Group 3, or at least one element or ion of an element from IUPAC Group 4, or at 1 east one element or ion of an element from IUPAC Group 5, or at least one element or ion of an element from IUPAC Group 6, or at least one element or ion of an element from IUPAC Group 7. The at least one second metal or metal ion may, in other cases, comprise elements or ions of elements from more than one of IUPAC Groups 4, 5, 6, or 7.

Applicants have discovered that metals or metal ions from IUPAC Groups 3, 4, 5, 6, or 7 may be used to prepare metal nanowires, such as, for example, silver nanowires, with desirable control of thickness, or length, or both, often with improved control of non-wire contamination.

IUPAC Group 3 metals or metal ions comprise scandium, ions of scandium, yttrium, ions of yttrium, lanthanum, and ions of lanthanum. Exemplary compounds comprising IUPAC Group 3 metals or metal ions are scandium (II) chloride hexahydrate, yttrium (III) chloride hexahydrate, and lanthanum (III) chloride heptahydrate. Various metal ion oxidation states, such as, for example, +2, +3, or +4, are thought to be useful.

IUPAC Group 4 metals or metal ions comprise titanium, ions of titanium, zirconium, ions of zirconium, hafnium, and ions of hafnium. Exemplary compounds comprising IUPAC Group 4 metals or metal ions are titanium (IV) chloride, zirconium tetrachloride bis(tetrahydrofuran) adduct, and hafnium tetrachloride bis(tetrahydrofuran) adduct. Various metal ion oxidation states, such as, for example, +2, +3, or +4, are thought to be useful.

IUPAC Group 5 metals or metal ions comprise vanadium, ions of vanadium, niobium, ions of niobium, tantalum, and ions of tantalum. Exemplary compounds comprising IUPAC Group 5 metals or metal ions are vanadium (III) chloride, niobium (V) chloride, and tantalum (V) chloride. Various metal ion oxidation states, such as, for example, +2, +3, +4, +5, or higher, are thought to be useful.

IUPAC Group 6 metals or metal ions comprise chromium, ions of chromium, molybdenum, ions of molybdenum, tungsten, and ions of tungsten. Exemplary compounds comprising IUPAC Group 6 metals or metal ions are chromium (III) chloride hexahydrate, molybdenum (VI) dichloride dioxide, and tungsten (IV) chloride. Various metal ion oxidation states, such as, for example, +2, +3, or +4, are thought to be useful.

IUPAC Group 7 metals or metal ions comprise manganese, ions of manganese, technetium, ions of technetium, rhenium, and ions of rhenium. Exemplary compounds comprising IUPAC Group 7 metals or metal ions are manganese (II) chloride and rhenium (III) chloride. It is believed that other metal ion oxidation states, such as, for example, +3, +4, +5, +6, or +7, may also provide useful results.

Metals or metal ions from IUPAC Groups 3, 4, 5, 6, or 7 may also comprise metal oxide compounds, such as, for example, transition metal oxide compounds or metal oxide halide compounds, such as those comprising at least one metal atom from IUPAC Groups 3, 4, 5, 6, or 7, such as, for example, molybdenum, tungsten, vanadium, zirconium, and the like. In some cases, the metal oxide compounds may comprise metal oxide halide compounds, such as metal oxide chloride compounds. The metal oxide halide compounds may comprise transition metal oxide halide compounds, such as, for example, transition metal chloride compounds. Exemplary metal oxide compounds are $MoO_2Cl_2$, $MoOCl_4$, $WO_2Cl_2$, $WOCl_4$, and $VOCl_3$.

Nanostructures, Nanostructures, Nanowires, and Articles

In some embodiments, the metal product formed by such methods is a nanostructure, such as, for example, a one-dimensional nanostructure. Nanostructures are structures having at least one "nanoscale" dimension less than 300 nm. Examples of such nanostructures are nanorods, nanowires, nanotubes, nanopyramids, nanoprisms, nanoplates, and the like. "One-dimensional" nanostructures have one dimension that is much larger than the other two nanoscale dimensions, such as, for example, at least about 10 or at least about 100 or at least about 200 or at least about 1000 times larger.

Such one-dimensional nanostructures may, in some cases, comprise nanowires. Nanowires are one-dimensional nanostructures in which the two short dimensions (the thickness dimensions) are less than 300 nm, while the third dimension (the length dimension) is greater than 1 micron, preferably greater than 10 microns, and the aspect ratio (ratio of the length dimension to the larger of the two thickness dimensions) is greater than five. Nanowires are being employed as conductors in electronic devices or as elements in optical devices, among other possible uses. Silver nanowires are preferred in some such applications.

The compositions and methods of the present application allow tailoring of nanowire diameters. In some cases, nanowires may have a specific range of thickness. Thinner nanowires can be useful in applications where transparency is important, while thicker nanowires can be useful in applications requiring high current densities. A medium range of thicknesses may be useful to achieve a balance of such properties. Such nanowires may, for example, comprise an average diameter of between about 10 nm and about 300 nm, or of between about 25 nm and about 260 nm, or of between about 25 nm and about 60 nm, or of between about 60 nm and about 140 nm, or of between about 140 nm and about 260 nm.

Such methods may be used to prepare nanostructures other than nanowires, such as, for example, nanocubes, nanorods, nanopyramids, nanotubes, and the like. Nanowires and other nanostructure products may be incorporated into articles, such as, for example, electronic displays, touch screens, portable telephones, cellular telephones, computer displays, laptop computers, tablet computers, point-of-purchase kiosks, music players, televisions, electronic games, electronic book readers, transparent electrodes, solar cells, light emitting diodes, other electronic devices, medical imaging devices, medical imaging media, and the like.

Preparation Methods

A common method of preparing nanostructures, such as, for example, nanowires, is the "polyol" process. Such a process is described in, for example, *Angew. Chem. Int. Ed.* 2009, 48, 60, Y. Xia, Y. Xiong, B. Lim, S. E. Skrabalak, which is hereby incorporated by reference in its entirety. Such processes typically reduce a metal cation, such as, for example, a silver cation, to the desired metal nanostructure product, such as, for example, a silver nanowire. Such a reduction may be carried out in a reaction mixture that may, for example, comprise one or more polyols, such as, for example, ethylene glycol (EG), propylene glycol, butanediol, glycerol, sugars, carbohydrates, and the like; one or more protecting agents, such as, for example, polyvinylpyrrolidinone (also known as polyvinylpyrrolidone or PVP), other polar polymers or copolymers, surfactants, acids, and the like; and one or more metal ions. These and other components may be used in such reaction mixtures, as is known in the art. The reduction may, for example, be carried out at one or more temperatures from about 120° C. to about 190° C., or from about 80° C. and about 190° C.

Exemplary Embodiments

U.S. Provisional Application No. 61/421,294, filed Dec. 9, 2010, entitled METAL ION CATALYSIS OF METAL ION REDUCTION, METHODS, COMPOSITIONS, AND ARTICLES, which is hereby incorporated by reference in its entirety, disclosed the following 27 non-limiting exemplary embodiments:

A. A method comprising:
   providing a composition comprising:
      at least one first compound comprising at least one first reducible metal ion,
      at least one second compound comprising at least one second metal or metal ion differing in atomic number from said at least one first reducible metal, said at least one second metal or metal ion comprising at least one element from IUPAC Group 7, and
      at least one solvent; and
   reducing the at least one first reducible metal ion to at least one first metal.

B. The method of embodiment A, wherein the composition further comprises at least one protecting agent.

C. The method of embodiment B, wherein the at least one protecting agent comprises at least one of: one or more surfactants, one or more acids, or one or more polar polymers.

D. The method of embodiment B, wherein the at least one protecting agent comprises polyvinylpyrrolidinone.

E. The method of embodiment B, further comprising inerting the at least one protecting agent.

F. The method of embodiment A, wherein the at least one first reducible metal ion comprises at least one coinage metal ion.

G. The method of embodiment A, wherein the at least one first reducible metal ion comprises at least one ion of an element from IUPAC Group 11.

H. The method of embodiment A, wherein the at least one first reducible metal ion comprises at least one ion of silver.

J. The method of embodiment A, wherein the at least one first compound comprises silver nitrate.

K. The method of embodiment A, wherein the at least one second metal or metal ion comprises manganese or an ion of manganese.

L. The method of embodiment A, wherein the at least one second compound comprises at least one salt of said at least one second metal or metal ion.

M. The method of embodiment L, wherein the at least one salt comprises at least one chloride.

N. The method of embodiment A, wherein the at least one solvent comprises at least one polyol.

P. The method of embodiment A, wherein the at least one solvent comprises at least one of: ethylene glycol, propylene glycol, glycerol, one or more sugars, or one or more carbohydrates.

Q. The method of embodiment A, wherein the composition has a ratio of the total moles of the at least one second metal or metal to the moles of the at least one first reducible metal ion from about 0.0001 to about 0.1.

R. The method of embodiment A, wherein the reduction is carried out at one or more temperatures from about 120° C. to about 190° C.

S. The method of embodiment A, further comprising inerting one or more of: the composition, the at least one compound comprising at least one first reducible metal ion, the at least one second metal or metal ion, or the at least one solvent.

T. The at least one first metal produced according to the method of embodiment A.

U. At least one article comprising the at least one first metal produced according to the method of embodiment A.

V. The at least one article of embodiment U, wherein the at least one first metal comprises one or more nanowires, nanocubes, nanorods, nanopyramids, or nanotubes.

W. The at least one article of embodiment U, wherein the at least one first metal comprises at least one object having an average diameter of between about 10 nm and about 500 nm.

X. The at least one article of embodiment U, wherein the at least one first metal comprises at least one object having an aspect ratio from about 50 to about 10,000.

Y. At least one metal nanowire with an average diameter of between about 10 nm and about 150 nm, and with an aspect ratio from about 50 to about 10,000.

Z. The nanowire of embodiment Y, wherein the at least one metal comprises at least one coinage metal.

AA. The nanowire of embodiment Y, wherein the at least one metal comprises at least one element of IUPAC Group 11.

AB. The nanowire of embodiment Y, wherein the at least one metal comprises silver.

AC. At least one article comprising the at least one metal nanowire of embodiment Y.

U.S. Provisional Application No. 61/423,744, filed Dec. 16, 2010, entitled METAL ION CATALYSIS OF METAL ION REDUCTION, METHODS, COMPOSITIONS, AND ARTICLES, which is hereby incorporated by reference in its entirety, disclosed the following 27 non-limiting exemplary embodiments:

AD. A method comprising:
   providing a composition comprising:
      at least one first compound comprising at least one first reducible metal ion,
      at least one second compound comprising at least one second metal or metal ion differing in atomic number from said at least one first reducible metal, said at least one second metal or metal ion comprising at least one element having an oxidation state of 4+ or greater, and
      at least one solvent; and
   reducing the at least one first reducible metal ion to at least one first metal.

AE. The method of embodiment AD, wherein the composition further comprises at least one protecting agent.

AF. The method of embodiment AE, wherein the at least one protecting agent comprises at least one of: one or more surfactants, one or more acids, or one or more polar polymers.

AG. The method of embodiment AE, wherein the at least one protecting agent comprises polyvinylpyrrolidinone.

AH. The method of embodiment AE, further comprising inerting the at least one protecting agent.

AJ. The method of embodiment AD, wherein the at least one first reducible metal ion comprises at least one coinage metal ion.

AK. The method of embodiment AD, wherein the at least one first reducible metal ion comprises at least one ion of an element from IUPAC Group 11.

AL. The method of embodiment AD, wherein the at least one first reducible metal ion comprises at least one ion of silver.

AM. The method of embodiment AD, wherein the at least one first compound comprises silver nitrate.

AN. The method of embodiment AD, wherein the at least one second metal or metal ion comprises niobium or an ion of niobium.

AP. The method of embodiment AD, wherein the at least one second compound comprises at least one salt of said at least one second metal or metal ion.

AQ. The method of embodiment AP, wherein the at least one salt comprises at least one chloride.

AR. The method of embodiment AD, wherein the at least one solvent comprises at least one polyol.

AS. The method of embodiment AD, wherein the at least one solvent comprises at least one of: ethylene glycol, propylene glycol, glycerol, one or more sugars, or one or more carbohydrates.

AT. The method of embodiment AD, wherein the composition has a ratio of the total moles of the at least one second metal or metal to the moles of the at least one first reducible metal ion from about 0.0001 to about 0.1.

AU. The method of embodiment AD, wherein the reduction is carried out at one or more temperatures from about 120° C. to about 190° C.

AV. The method of embodiment AD, further comprising inerting one or more of: the composition, the at least one compound comprising at least one first reducible metal ion, the at least one second metal or metal ion, or the at least one solvent.

AW. The at least one first metal produced according to the method of embodiment AD.

AX. At least one article comprising the at least one first metal produced according to the method of embodiment AD.

AY. The at least one article of embodiment AX, wherein the at least one first metal comprises one or more nanowires, nanocubes, nanorods, nanopyramids, or nanotubes.

AZ. The at least one article of embodiment AX, wherein the at least one first metal comprises at least one object having an average diameter of between about 10 nm and about 500 nm.

BA. The at least one article of embodiment AX, wherein the at least one first metal comprises at least one object having an aspect ratio from about 50 to about 10,000.

BB. At least one metal nanowire with an average diameter of between about 10 nm and about 150 nm, and with an aspect ratio from about 50 to about 10,000.

BC. The nanowire of embodiment BB, wherein the at least one metal comprises at least one coinage metal.

BD. The nanowire of embodiment BB, wherein the at least one metal comprises at least one element of IUPAC Group 11.

BE. The nanowire of embodiment BB, wherein the at least one metal comprises silver.

BF. At least one article comprising the at least one metal nanowire of embodiment BB.

U.S. Provisional Application No. 61/488,824, filed May 23, 2011, entitled NANOWIRE PREPARATION METHODS, COMPOSITIONS, AND ARTICLES, which is hereby incorporated by reference in its entirety, disclosed the following 27 non-limiting exemplary embodiments:

BG. A method comprising:
 providing a composition comprising:
  at least one first compound comprising at least one first reducible metal ion,
  at least one second compound comprising at least one second metal or metal ion differing in atomic number from said at least one first reducible metal, said at least one second metal or metal ion comprising at least one element from IUPAC Group 7, and
  at least one solvent; and
 reducing the at least one first reducible metal ion to at least one first metal.

BH. The method of embodiment BG, wherein the composition further comprises at least one protecting agent.

BJ. The method of embodiment BH, wherein the at least one protecting agent comprises at least one of: one or more surfactants, one or more acids, or one or more polar polymers.

BK. The method of embodiment BH, wherein the at least one protecting agent comprises polyvinylpyrrolidinone.

BL. The method of embodiment BH, further comprising inerting the at least one protecting agent.

BM. The method of embodiment BG, wherein the at least one first reducible metal ion comprises at least one coinage metal ion.

BN. The method of embodiment BG, wherein the at least one first reducible metal ion comprises at least one ion of an element from IUPAC Group 11.

BP. The method of embodiment BG, wherein the at least one first reducible metal ion comprises at least one ion of silver.

BQ. The method of embodiment BG, wherein the at least one first compound comprises silver nitrate.

BR. The method of embodiment BG, wherein the at least one second metal or metal ion comprises rhenium or an ion of rhenium.

BS. The method of embodiment BG, wherein the at least one second compound comprises at least one chloride.

BT. The method of embodiment BG, wherein the at least one second compound comprises rhenium(III) chloride.

BU. The method of embodiment BG, wherein the at least one solvent comprises at least one polyol.

BV. The method of embodiment BG, wherein the at least one solvent comprises at least one of: ethylene glycol, propylene glycol, glycerol, one or more sugars, or one or more carbohydrates.

BW. The method of embodiment BG, wherein the composition has a ratio of the total moles of the at least one second metal or metal ion to the total moles of the at least one first reducible metal ion from about 0.0001 to about 0.1.

BX. The method of embodiment BG, wherein the reduction is carried out at one or more temperatures from about 120° C. to about 190° C.

BY. The method of embodiment BG, further comprising inerting one or more of: the composition, the at least one compound comprising the at least one first reducible metal ion, the at least one second metal or metal ion, or the at least one solvent.

BZ. The at least one first metal produced according to the method of embodiment BG.

CA. At least one article comprising the at least one first metal produced according to the method of embodiment BG.

CB. The at least one article of embodiment CA, wherein the at least one first metal comprises one or more nanowires, nanocubes, nanorods, nanopyramids, or nanotubes.

CC. The at least one article of embodiment CA, wherein the at least one first metal comprises at least one object having an average diameter of between about 10 nm and about 500 nm.

CD. The at least one article of embodiment CA, wherein the at least one first metal comprises at least one object having an aspect ratio from about 50 to about 10,000.

CE. At least one metal nanowire with an average diameter of between about 10 nm and about 150 nm, and with an aspect ratio from about 50 to about 10,000.

CF. The nanowire of embodiment CE, wherein the at least one metal nanowire comprises at least one coinage metal.

CG. The nanowire of embodiment CE, wherein the at least one metal nanowire comprises at least one element of IUPAC Group 11.

CH. The nanowire of embodiment CE, wherein the at least one metal nanowire comprises silver.

CJ. At least one article comprising the at least one metal nanowire of embodiment CE.

U.S. Provisional Application No. 61/488,834, filed May 23, 2011, entitled METAL ION CATALYSIS OF METAL ION REDUCTION, METHODS, COMPOSITIONS, AND ARTICLES, which is hereby incorporated by reference in its entirety, disclosed the following 27 non-limiting exemplary embodiments:

CK. A method comprising:
  providing a composition comprising:
    at least one first compound comprising at least one first reducible metal ion,
    at least one second compound comprising at least one second metal or metal ion differing in atomic number from said at least one first reducible metal, said at least one second metal or metal ion comprising at least one element from IUPAC Group 5, and
    at least one solvent; and
  reducing the at least one first reducible metal ion to at least one first metal.

CL. The method of embodiment CK, wherein the composition further comprises at least one protecting agent.

CM. The method of embodiment CL, wherein the at least one protecting agent comprises at least one of: one or more surfactants, one or more acids, or one or more polar polymers.

CN. The method of embodiment CL, wherein the at least one protecting agent comprises polyvinylpyrrolidinone.

CP. The method of embodiment CL, further comprising inerting the at least one protecting agent.

CQ. The method of embodiment CK, wherein the at least one first reducible metal ion comprises at least one coinage metal ion.

CR. The method of embodiment CK, wherein the at least one first reducible metal ion comprises at least one ion of an element from IUPAC Group 11.

CS. The method of embodiment CK, wherein the at least one first reducible metal ion comprises at least one ion of silver.

CT. The method of embodiment CK, wherein the at least one first compound comprises silver nitrate.

CU. The method of embodiment CK, wherein the at least one second metal or metal ion comprises vanadium or an ion of vanadium.

CV. The method of embodiment CK, wherein the at least one second compound comprises at least one salt of said at least one second metal or metal ion.

CW. The method of embodiment CV, wherein the at least one salt comprises at least one chloride.

CX. The method of embodiment CK, wherein the at least one solvent comprises at least one polyol.

CY. The method of embodiment CK, wherein the at least one solvent comprises at least one of: ethylene glycol, propylene glycol, glycerol, one or more sugars, or one or more carbohydrates.

CZ. The method of embodiment CK, wherein the composition has a ratio of the total moles of the at least one second metal or metal ion to the total moles of the at least one first reducible metal ion from about 0.0001 to about 0.1.

DA. The method of embodiment CK, wherein the reduction is carried out at one or more temperatures from about 120° C. to about 190° C.

DB. The method of embodiment CK, further comprising inerting one or more of: the composition, the at least one compound comprising the at least one first reducible metal ion, the at least one second metal or metal ion, or the at least one solvent.

DC. The at least one first metal produced according to the method of embodiment CK.

DD. At least one article comprising the at least one first metal produced according to the method of embodiment CK.

DE. The at least one article of embodiment DD, wherein the at least one first metal comprises one or more nanowires, nanocubes, nanorods, nanopyramids, or nanotubes.

DF. The at least one article of embodiment DD, wherein the at least one first metal comprises at least one object having an average diameter of between about 10 nm and about 500 nm.

DG. The at least one article of embodiment DD, wherein the at least one first metal comprises at least one object having an aspect ratio from about 50 to about 10,000.

DH. At least one metal nanowire with an average diameter of between about 10 nm and about 150 nm, and with an aspect ratio from about 50 to about 10,000.

DJ. The nanowire of embodiment DH, wherein the at least one metal nanowire comprises at least one coinage metal.

DK. The nanowire of embodiment DH, wherein the at least one metal nanowire comprises at least one element of IUPAC Group 11.

DL. The nanowire of embodiment DH, wherein the at least one metal nanowire comprises silver.

DM. At least one article comprising the at least one metal nanowire of embodiment DH.

U.S. Provisional Application No. 61/488,840, filed May 23, 2011, entitled METAL ION CATALYSIS OF METAL ION REDUCTION, METHODS, COMPOSITIONS, AND ARTICLES, which is hereby incorporated by reference in its entirety, disclosed the following 27 non-limiting exemplary embodiments.

DN. A method comprising:
  providing a composition comprising:
    at least one first compound comprising at least one first reducible metal ion,
    at least one second compound comprising at least one second metal or metal ion differing in atomic number from said at least one first reducible metal, said at least one second metal or metal ion comprising at least one element from IUPAC Group 3, and
    at least one solvent; and
  reducing the at least one first reducible metal ion to at least one first metal.

DP. The method of embodiment DN, wherein the composition further comprises at least one protecting agent.

DQ. The method of embodiment DP, wherein the at least one protecting agent comprises at least one of: one or more surfactants, one or more acids, or one or more polar polymers.

DR. The method of embodiment DP, wherein the at least one protecting agent comprises polyvinylpyrrolidinone.

DS. The method of embodiment DP, further comprising inerting the at least one protecting agent.

DT. The method of embodiment DN, wherein the at least one first reducible metal ion comprises at least one coinage metal ion.

DU. The method of embodiment DN, wherein the at least one first reducible metal ion comprises at least one ion of an element from IUPAC Group 11.

DV. The method of embodiment DN, wherein the at least one first reducible metal ion comprises at least one ion of silver.

DW. The method of embodiment DN, wherein the at least one first compound comprises silver nitrate.

DX. The method of embodiment DN, wherein the at least one second metal or metal ion comprises scandium or an ion of scandium.

DY. The method of embodiment DN, wherein the at least one second compound comprises at least one salt of said at least one second metal or metal ion.

DZ. The method of embodiment 11, wherein the at least one salt comprises at least one chloride.

EA. The method of embodiment DN, wherein the at least one solvent comprises at least one polyol.

EB. The method of embodiment DN, wherein the at least one solvent comprises at least one of: ethylene glycol, propylene glycol, glycerol, one or more sugars, or one or more carbohydrates.

EC. The method of embodiment DN, wherein the composition has a ratio of the total moles of the at least one second metal or metal ion to the total moles of the at least one first reducible metal ion from about 0.0001 to about 0.1.

ED. The method of embodiment DN, wherein the reduction is carried out at one or more temperatures from about 120° C. to about 190° C.

EE. The method of embodiment DN, further comprising inerting one or more of: the composition, the at least one compound comprising the at least one first reducible metal ion, the at least one second metal or metal ion, or the at least one solvent.

EF. The at least one first metal produced according to the method of embodiment DN.

EG. At least one article comprising the at least one first metal produced according to the method of embodiment DN.

EH. The at least one article of embodiment EG, wherein the at least one first metal comprises one or more nanowires, nanocubes, nanorods, nanopyramids, or nanotubes.

EJ. The at least one article of embodiment EG, wherein the at least one first metal comprises at least one object having an average diameter of between about 10 nm and about 500 nm.

EK. The at least one article of embodiment EG, wherein the at least one first metal comprises at least one object having an aspect ratio from about 50 to about 10,000.

EL. At least one metal nanowire with an average diameter of between about 10 nm and about 150 nm, and with an aspect ratio from about 50 to about 10,000.

EM. The nanowire of embodiment EL, wherein the at least one metal nanowire comprises at least one coinage metal.

EN. The nanowire of embodiment EL, wherein the at least one metal nanowire comprises at least one element of IUPAC Group 11.

EP. The nanowire of embodiment EL, wherein the at least one metal nanowire comprises silver.

EQ. At least one article comprising the at least one metal nanowire of embodiment EL.

U.S. Provisional Application No. 61/488,880, filed May 23, 2011, entitled METAL ION CATALYSIS OF METAL ION REDUCTION, METHODS, COMPOSITIONS, AND ARTICLES, which is hereby incorporated by reference in its entirety, disclosed the following 27 non-limiting exemplary embodiments:

ER. A method comprising:
  providing a composition comprising:
    at least one first compound comprising at least one first reducible metal ion,
    at least one second compound comprising at least one second metal ion differing in atomic number from said at least one first reducible metal, said at least one second metal ion comprising at least one element from IUPAC Group 4, and
    at least one solvent; and
  reducing the at least one first reducible metal ion to at least one first metal.

ES. The method of embodiment ER, wherein the composition further comprises at least one protecting agent.

ET. The method of embodiment ES, wherein the at least one protecting agent comprises at least one of: one or more surfactants, one or more acids, or one or more polar polymers.

EU. The method of embodiment ES, wherein the at least one protecting agent comprises polyvinylpyrrolidinone.

EV. The method of embodiment ES, further comprising inerting the at least one protecting agent.

EW. The method of embodiment ER, wherein the at least one first reducible metal ion comprises at least one coinage metal ion.

EX. The method of embodiment ER, wherein the at least one first reducible metal ion comprises at least one ion of an element from IUPAC Group 11.

EY. The method of embodiment ER, wherein the at least one first reducible metal ion comprises at least one ion of silver.

EZ. The method of embodiment ER, wherein the at least one first compound comprises silver nitrate.

FA. The method of embodiment ER, wherein the at least one second metal ion comprises an ion of titanium.

FB. The method of embodiment ER, wherein the at least one second compound comprises at least one chloride.

FC. The method of embodiment ER, wherein the at least one second compound comprises titanium(IV) chloride.

FD. The method of embodiment ER, wherein the at least one solvent comprises at least one polyol.

FE. The method of embodiment ER, wherein the at least one solvent comprises at least one of: ethylene glycol, propylene glycol, glycerol, one or more sugars, or one or more carbohydrates.

FF. The method of embodiment ER, wherein the composition has a ratio of the total moles of the at least one second metal or metal ion to the total moles of the at least one first reducible metal ion from about 0.0001 to about 0.1.

FG. The method of embodiment ER, wherein the reduction is carried out at one or more temperatures from about 120° C. to about 190° C.

FH. The method of embodiment ER, further comprising inerting one or more of: the composition, the at least one compound comprising the at least one first reducible metal ion, the at least one second metal or metal ion, or the at least one solvent.

FJ. The at least one first metal produced according to the method of embodiment ER.

FK. At least one article comprising the at least one first metal produced according to the method of embodiment ER.

FL. The at least one article of embodiment FK, wherein the at least one first metal comprises one or more nanowires, nanocubes, nanorods, nanopyramids, or nanotubes.

FM. The at least one article of embodiment FK, wherein the at least one first metal comprises at least one object having an average diameter of between about 10 nm and about 500 nm.

FN. The at least one article of embodiment FK, wherein the at least one first metal comprises at least one object having an aspect ratio from about 50 to about 10,000.

FP. At least one metal nanowire with an average diameter of between about 10 nm and about 150 nm, and with an aspect ratio from about 50 to about 10,000.

FQ. The nanowire of embodiment FP, wherein the at least one metal nanowire comprises at least one coinage metal.

FR. The nanowire of embodiment FP, wherein the at least one metal nanowire comprises at least one element of IUPAC Group 11.

FS. The nanowire of embodiment FP, wherein the at least one metal nanowire comprises silver.

FT. At least one article comprising the at least one metal nanowire of embodiment FP.

U.S. Provisional Application No. 61/488,945, filed May 23, 2011, entitled NANOWIRE PREPARATION METHODS, COMPOSITIONS, AND ARTICLES, which is hereby incorporated by reference in its entirety, disclosed the following 16 non-limiting exemplary embodiments:

FU. A method comprising:
  providing a composition comprising at least one metal oxide compound; and
  reducing at least one first metal ion to at least one first metal in the presence of the metal oxide compound.

FV. The method according to embodiment FU, wherein the at least one metal oxide compound comprises at least one metal oxide halide compound.

FW. The method according to embodiment FU, wherein the at least one metal oxide compound comprises at least one metal oxide chloride compound.

FX. The method according embodiment FU, wherein the at least one metal oxide compound comprises at least one transition metal oxide compound.

FY. The method according to embodiment FU, wherein the at least one metal oxide compound comprises at least one transition metal halide compound.

FZ. The method according to embodiment FU, wherein the at least one metal oxide compound comprises at least one transition metal chloride compound.

GA. The method according to embodiment FU, wherein the at least one metal oxide compound comprises at least one transition metal.

GB. The method according to embodiment FU, wherein the at least one metal oxide compound comprises at least one molybdenum, tungsten, vanadium, or zirconium atom.

GC. The method according to embodiment FU, wherein the at least one metal oxide compound comprises at least one of $MoO_2Cl_2$, $MoOCl_4$, $WO_2Cl_2$, $WOCl_4$, $VOCl_3$, or $ZrOCl_2$.

GD. The method according to embodiment FU, wherein the at least one metal oxide compound comprises molybdenum(IV) dichloride dioxide.

GE. The method according to embodiment FU, wherein the at least one first metal ion comprises at least one element from IUPAC Group 11.

GF. The method according to embodiment FU, wherein the at least one first metal ion comprises at least one coinage metal ion.

GG. The method according to embodiment FU, wherein the at least one first metal ion comprises at least one silver ion.

GH. The at least one first metal product produced according to the method of embodiment FU.

GJ. The at least one first metal product according to embodiment GH, said at least one product comprising at least one nanowire.

GK. An article comprising the at least one first metal product according to embodiment GH.

U.S. Provisional Application No. 61/488,977, filed May 23, 2011, entitled NANOWIRE PREPARATION METHODS, COMPOSITIONS, AND ARTICLES, which is hereby incorporated by reference in its entirety, disclosed the following 20 non-limiting exemplary embodiments:

GL. A method comprising:
providing at least one first composition comprising at least one first reducible metal ion, and
reducing the at least one first reducible metal ion to at least one first metal in the presence of at least one second metal ion comprising at least one IUPAC Group 6 element.

GM. The method according to embodiment GL, wherein the at least one first reducible metal ion comprises at least one coinage metal ion.

GN. The method according to embodiment GL, wherein the at least one first reducible metal ion comprises at least one ion of an IUPAC Group 11 element.

GP. The method according to embodiment GL, wherein the at least one first reducible metal ion comprises at least one silver ion.

GQ. The method according to embodiment GL, wherein the at least one composition comprises silver nitrate.

GR. The method according to embodiment GL, wherein the at least one second metal ion comprises a tungsten ion.

GS. The method according to embodiment GL, wherein the at least one second metal ion comprises tungsten in its +4 oxidation state.

GT. The method according to embodiment GL, wherein the reduction occurs in the presence of at least one protecting agent.

GU. The method according to embodiment GL, wherein the reduction occurs in the presence of at least one polyol.

GV. A product comprising the at least one first metal produced by the method according to embodiment GL.

GW. The product according to embodiment GV comprising at least one metal nanowire.

GX. An article comprising the product according to embodiment GV.

GY. A composition comprising at least one metal nanowire, at least one chloride ion, and at least one ion of an IUPAC Group 6 element.

GZ. The composition according to embodiment GY, wherein the at least one metal nanowire comprises at least one silver nanowire.

HA. The composition according to embodiment GY, wherein the at least one metal nanowire comprises an average diameter between about 10 nm and about 500 nm.

HB. The composition according to embodiment GY, wherein the at least one metal nanowire comprises an aspect ratio between about 50 and about 10,000.

HC. The composition according to embodiment GY, wherein the at least one metal nanowire comprises an average diameter between about 10 nm and about 150 nm, and an aspect ratio between about 50 and about 10,000.

HD. A product comprising the at least one metal nanowire of the composition of embodiment GY.

HE. An article comprising the at least one product according to embodiment HD.

HF. The article according to embodiment HE comprising at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

U.S. Provisional Application No. 61/488,983, filed May 23, 2011, entitled NANOWIRE PREPARATION METHODS, COMPOSITIONS, AND ARTICLES, which is hereby incorporated by reference in its entirety, disclosed the following 20 non-limiting exemplary embodiments:

HG. A method comprising:
providing at least one first composition comprising at least one first reducible metal ion, and
reducing the at least one first reducible metal ion to at least one first metal in the presence of at least one second metal ion comprising at least one IUPAC Group 6 element.

HH. The method according to embodiment HG, wherein the at least one first reducible metal ion comprises at least one coinage metal ion.

HJ. The method according to embodiment HG, wherein the at least one first reducible metal ion comprises at least one ion of an IUPAC Group 11 element.

HK. The method according to embodiment HG, wherein the at least one first reducible metal ion comprises at least one silver ion.

HL. The method according to embodiment HG, wherein the at least one composition comprises silver nitrate.

HM. The method according to embodiment HG, wherein the at least one second metal ion comprises a chromium ion.

HN. The method according to embodiment HG, wherein the at least one second metal ion comprises chromium in its +3 oxidation state.

HP. The method according to embodiment HG, wherein the reduction occurs in the presence of at least one protecting agent.

HQ. The method according to embodiment HG, wherein the reduction occurs in the presence of at least one polyol.

HR. A product comprising the at least one first metal produced by the method according to embodiment HG.

HS. The product according to embodiment HR comprising at least one metal nanowire.

HT. An article comprising the product according to embodiment HR.

HU. A composition comprising at least one metal nanowire, at least one chloride ion, and at least one ion of an IUPAC Group 6 element.

HV. The composition according to embodiment HU, wherein the at least one metal nanowire comprises at least one silver nanowire.

HW. The composition according to embodiment HU, wherein the at least one metal nanowire comprises an average diameter between about 10 nm and about 500 nm.

HX. The composition according to embodiment HU, wherein the at least one metal nanowire comprises an aspect ratio between about 50 and about 10,000.

HY. The composition according to embodiment HU, wherein the at least one metal nanowire comprises an average diameter between about 10 nm and about 150 nm, and an aspect ratio between about 50 and about 10,000.

HZ. A product comprising the at least one metal nanowire of the composition of embodiment HU.

JA. An article comprising the at least one product according to embodiment HZ.

JB. The article according to embodiment JA comprising at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

U.S. Provisional Application No. 61/494,072, filed Jun. 7, 2011, entitled NANOWIRE PREPARATION METHODS, COMPOSITIONS, AND ARTICLES, which is incorporated by reference in its entirety, disclosed the following 20 non-limiting exemplary embodiments:

JC. A method comprising:
providing at least one first composition comprising at least one first reducible metal ion, and
reducing the at least one first reducible metal ion to at least one first metal in the presence of at least one second metal ion comprising at least one lanthanide element or actinide element.

JD. The method according to embodiment JC, wherein the at least one first reducible metal ion comprises at least one coinage metal ion.

JE. The method according to embodiment JC, wherein the at least one first reducible metal ion comprises at least one ion of an IUPAC Group 11 element.

JF. The method according to embodiment JC, wherein the at least one first reducible metal ion comprises at least one silver ion.

JK. The method according to embodiment JC, wherein the at least one composition comprises silver nitrate.

JL. The method according to embodiment JC, wherein the at least one second metal ion comprises at least one lanthanum ion or actinide ion.

JM. The method according to embodiment JC, wherein the at least one second metal ion comprises lanthanum in its +3 oxidation state.

JN. The method according to embodiment JC, wherein the reduction occurs in the presence of at least one protecting agent.

JP. The method according to embodiment JC, wherein the reduction occurs in the presence of at least one polyol.

JQ. A product comprising the at least one first metal produced by the method according to embodiment JC.

JR. The product according to embodiment JQ comprising at least one metal nanowire.

JS. An article comprising the product according to embodiment JQ.

JT. A composition comprising at least one metal nanowire, at least one chloride ion, and at least one ion of a lanthanide element or at least one ion of an actinide element.

JU. The composition according to embodiment JT, wherein the at least one metal nanowire comprises at least one silver nanowire.

JV. The composition according to embodiment JT, wherein the at least one metal nanowire comprises an average diameter between about 10 nm and about 500 nm.

JW. The composition according to embodiment JT, wherein the at least one metal nanowire comprises an aspect ratio between about 50 and about 10,000.

JX. The composition according to embodiment JT, wherein the at least one metal nanowire comprises an average diameter between about 10 nm and about 150 nm, and an aspect ratio between about 50 and about 10,000.

JY. A product comprising the at least one metal nanowire of the composition of embodiment JT.

JZ. An article comprising the at least one product according to embodiment 18.

KA. The article according to embodiment JZ comprising at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

U.S. Provisional Application No. 61/522,741, filed Aug. 12, 2011, entitled NANOWIRE PREPARATION METHODS, COMPOSITIONS, AND ARTICLES, which is incorporated by reference in its entirety, disclosed the following 20 non-limiting exemplary embodiments:

KB. A method comprising:
providing at least one first composition comprising at least one first reducible metal ion, and
reducing the at least one first reducible metal ion to at least one first metal in the presence of at least one second metal ion comprising at least one element from IUPAC Group 3.

KC. The method according to embodiment KB, wherein the at least one first reducible metal ion comprises at least one coinage metal ion.

KD. The method according to embodiment KB, wherein the at least one first reducible metal ion comprises at least one ion of an IUPAC Group 11 element.

KE. The method according to embodiment KB, wherein the at least one first reducible metal ion comprises at least one silver ion.

KF. The method according to embodiment KB, wherein the at least one composition comprises silver nitrate.

KG. The method according to embodiment KB, wherein the at least one second metal ion comprises at least one yttrium ion.

KH. The method according to embodiment KB, wherein the at least one second metal ion comprises yttrium in its +3 oxidation state.

KJ. The method according to embodiment KB, wherein the reduction occurs in the presence of at least one protecting agent.

KK. The method according to embodiment KB, wherein the reduction occurs in the presence of at least one polyol.

KL. A product comprising the at least one first metal produced by the method according to embodiment KB.

KM. The product according to embodiment KL comprising at least one metal nanowire.

KN. An article comprising the product according to embodiment KL.

KP. A composition comprising at least one metal nanowire, at least one chloride ion, and at least one ion of an IUPAC Group 3 element.

KQ. The composition according to embodiment KP, wherein the at least one metal nanowire comprises at least one silver nanowire.

KR. The composition according to embodiment KP, wherein the at least one metal nanowire comprises an average diameter between about 10 nm and about 500 nm.

KT. The composition according to embodiment KP, wherein the at least one metal nanowire comprises an aspect ratio between about 50 and about 10,000.

KU. The composition according to embodiment KP, wherein the at least one metal nanowire comprises an average diameter between about 10 nm and about 150 nm, and an aspect ratio between about 50 and about 10,000.

KV. A product comprising the at least one metal nanowire of the composition of embodiment KP.

KW. An article comprising the at least one product according to embodiment KV.

KX. The article according to embodiment KW comprising at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

U.S. Provisional Application No. 61/523,977, filed Aug. 16, 2011, entitled NANOWIRE PREPARATION METHODS, COMPOSITIONS, AND ARTICLES, which is hereby incorporated by reference in its entirety, disclosed the following 27 non-limiting exemplary embodiments:

KY. A method comprising:
  providing a composition comprising:
    at least one first compound comprising at least one first reducible metal ion,
    at least one second compound comprising at least one second metal ion differing in atomic number from said at least one first reducible metal, said at least one second metal ion comprising at least one element from IUPAC Group 4, and
    at least one solvent; and
  reducing the at least one first reducible metal ion to at least one first metal.

KZ. The method of embodiment KY, wherein the composition further comprises at least one protecting agent.

LA. The method of embodiment KZ, wherein the at least one protecting agent comprises at least one of: one or more surfactants, one or more acids, or one or more polar polymers.

LB. The method of embodiment KZ, wherein the at least one protecting agent comprises polyvinylpyrrolidinone.

LC. The method of embodiment KZ, further comprising inerting the at least one protecting agent.

LD. The method of embodiment KY, wherein the at least one first reducible metal ion comprises at least one coinage metal ion.

LE. The method of embodiment KY, wherein the at least one first reducible metal ion comprises at least one ion of an element from IUPAC Group 11.

LF. The method of embodiment KY, wherein the at least one first reducible metal ion comprises at least one ion of silver.

LG. The method of embodiment KY, wherein the at least one first compound comprises silver nitrate.

LH. The method of embodiment KY, wherein the at least one second metal ion comprises an ion of zirconium or hafnium.

LJ. The method of embodiment KY, wherein the at least one second compound comprises at least one chloride.

LK. The method of embodiment KY, wherein the at least one second compound comprises at least one of zirconium tetrachloride bis(tetrahydrofuran) adduct or hafnium tetrachloride bis(tetrahydrofuran) adduct.

LM. The method of embodiment KY, wherein the at least one solvent comprises at least one polyol.

LN. The method of embodiment KY, wherein the at least one solvent comprises at least one of: ethylene glycol, propylene glycol, glycerol, one or more sugars, or one or more carbohydrates.

LP. The method of embodiment KY, wherein the composition has a ratio of the total moles of the at least one second metal or metal ion to the total moles of the at least one first reducible metal ion from about 0.0001 to about 0.1.

LQ. The method of embodiment KY, wherein the reduction is carried out at one or more temperatures from about 120° C. to about 190° C.

LR. The method of embodiment KY, further comprising inerting one or more of: the composition, the at least one compound comprising the at least one first reducible metal ion, the at least one second metal or metal ion, or the at least one solvent.

LS. The at least one first metal produced according to the method of embodiment KY.

LT. At least one article comprising the at least one first metal produced according to the method of embodiment KY.

LU. The at least one article of embodiment LT, wherein the at least one first metal comprises one or more nanowires, nanocubes, nanorods, nanopyramids, or nanotubes.

LV. The at least one article of embodiment LT, wherein the at least one first metal comprises at least one object having an average diameter of between about 10 nm and about 500 nm.

LX. The at least one article of embodiment LT, wherein the at least one first metal comprises at least one object having an aspect ratio from about 50 to about 10,000.

LY. At least one metal nanowire with an average diameter of between about 10 nm and about 150 nm, and with an aspect ratio from about 50 to about 10,000.

LZ. The nanowire of embodiment LY, wherein the at least one metal nanowire comprises at least one coinage metal.

MA. The nanowire of embodiment LY, wherein the at least one metal nanowire comprises at least one element of IUPAC Group 11.

MB. The nanowire of embodiment LY, wherein the at least one metal nanowire comprises silver.

MC. At least one article comprising the at least one metal nanowire of embodiment LY.

U.S. Provisional Application No. 61/523,987, filed Aug. 16, 2011, entitled NANOWIRE PREPARATION METH- ODS, COMPOSITIONS, AND ARTICLES, which is hereby incorporated by reference in its entirety, disclosed the following 27 non-limiting exemplary embodiments:

MD. A method comprising:
 providing a composition comprising:
  at least one first compound comprising at least one first reducible metal ion,
  at least one second compound comprising at least one second metal ion differing in atomic number from said at least one first reducible metal, said at least one second metal ion comprising at least one element from IUPAC Group 5, and
  at least one solvent; and
 reducing the at least one first reducible metal ion to at least one first metal.

ME. The method of embodiment MD, wherein the composition further comprises at least one protecting agent.

MF. The method of embodiment ME, wherein the at least one protecting agent comprises at least one of: one or more surfactants, one or more acids, or one or more polar polymers.

MG. The method of embodiment ME, wherein the at least one protecting agent comprises polyvinylpyrrolidinone.

MH. The method of embodiment ME, further comprising inerting the at least one protecting agent.

MJ. The method of embodiment MD, wherein the at least one first reducible metal ion comprises at least one coinage metal ion.

MK. The method of embodiment MD, wherein the at least one first reducible metal ion comprises at least one ion of an element from IUPAC Group 11.

ML. The method of embodiment MD, wherein the at least one first reducible metal ion comprises at least one ion of silver.

MM. The method of embodiment MD, wherein the at least one first compound comprises silver nitrate.

MN. The method of embodiment MD, wherein the at least one second metal ion comprises an ion of tantalum.

MP. The method of embodiment MD, wherein the at least one second compound comprises at least one chloride.

MQ. The method of embodiment MD, wherein the at least one second compound comprises tantalum (V) chloride.

MR. The method of embodiment MD, wherein the at least one solvent comprises at least one polyol.

MS. The method of embodiment MD, wherein the at least one solvent comprises at least one of: ethylene glycol, propylene glycol, glycerol, one or more sugars, or one or more carbohydrates.

MT. The method of embodiment MD, wherein the composition has a ratio of the total moles of the at least one second metal or metal ion to the total moles of the at least one first reducible metal ion from about 0.0001 to about 0.1.

MU. The method of embodiment MD, wherein the reduction is carried out at one or more temperatures from about 120° C. to about 190° C.

MV. The method of embodiment MD, further comprising inerting one or more of: the composition, the at least one compound comprising the at least one first reducible metal ion, the at least one second metal or metal ion, or the at least one solvent.

MU. The at least one first metal produced according to the method of embodiment MD.

MV. At least one article comprising the at least one first metal produced according to the method of embodiment MD.

MW. The at least one article of embodiment MV, wherein the at least one first metal comprises one or more nanowires, nanocubes, nanorods, nanopyramids, or nanotubes.

MX. The at least one article of embodiment MV, wherein the at least one first metal comprises at least one object having an average diameter of between about 10 nm and about 500 nm.

MY. The at least one article of embodiment MV, wherein the at least one first metal comprises at least one object having an aspect ratio from about 50 to about 10,000.

MZ. At least one metal nanowire with an average diameter of between about 10 nm and about 150 nm, and with an aspect ratio from about 50 to about 10,000.

NA. The nanowire of embodiment MZ, wherein the at least one metal nanowire comprises at least one coinage metal.

NB. The nanowire of embodiment MZ, wherein the at least one metal nanowire comprises at least one element of IUPAC Group 11.

NC. The nanowire of embodiment MZ, wherein the at least one metal nanowire comprises silver.

ND. At least one article comprising the at least one metal nanowire of embodiment MZ.

EXAMPLES

Example 1

To a 500 mL reaction flask was added 280 mL ethylene glycol (EG) and 1.2 g of 7.3 mM $MnCl_2$ in EG. This solution was stripped of at least some dissolved gases by bubbling $N_2$ into the solution for at least 2 hrs using a glass pipette at room temperature with mechanical stirring while at 100 rpm. (This operation will be referred to as "degassing" the solution in the sequel.) Stock solutions of 0.25 M $AgNO_3$ in EG and 0.77 M (based on moles of repeat units) polyvinylpyrrolidinone (PVP, 55,000 molecular weight) in EG were also degassed by bubbling $N_2$ into the solutions for 60 minutes. Two syringes where loaded with 20 mL each of the $AgNO_3$ and PVP solutions. The reaction mixture was heated to 145° C. under $N_2$ and the $AgNO_3$ and PVP solutions were added at a constant rate over 25 minutes via 12 gauge Teflon syringe needles. The reaction was held at 145° C. for 90 minutes then allowed to cool to room temperature. From the cooled mixture, the reaction mixture was diluted by an equal volume of acetone, and centrifuged at 500 G for 45 minutes. The supernatant was decanted, leaving a solid that was re-dispersed in 200 mL isopropanol by 10 minutes, and centrifuged again, decanted and diluted with 15 mL isopropanol.

Figure 2:
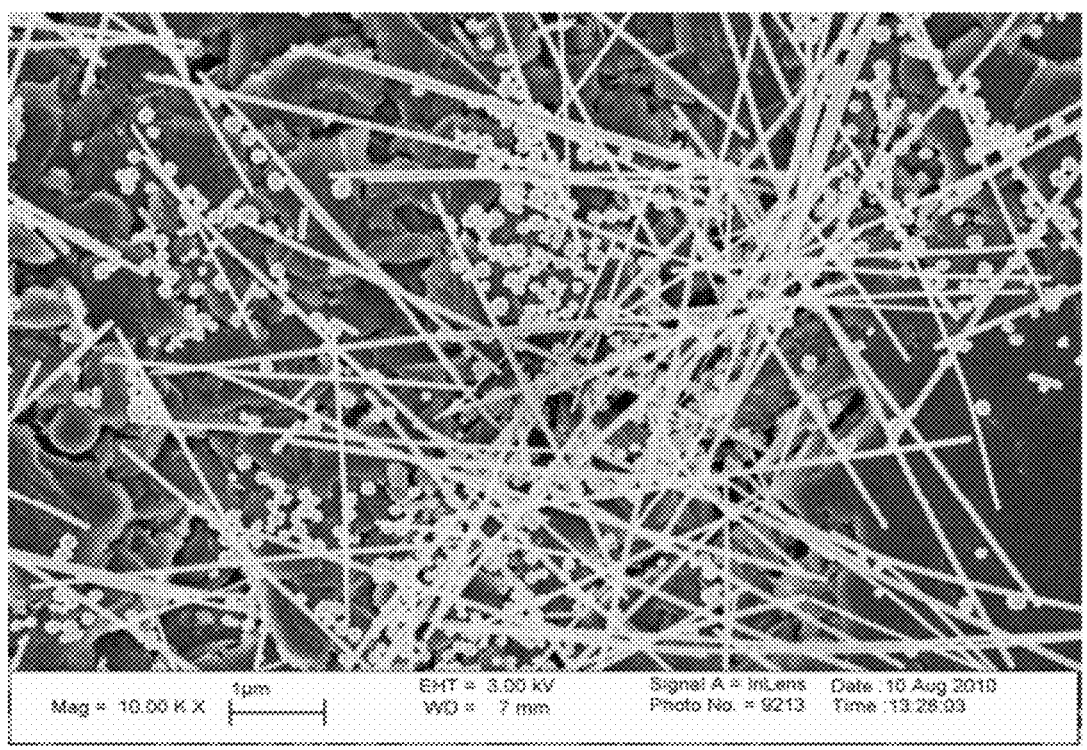
FIG. 2 shows a scanning electron micrograph of the silver nanowire product of Example 1.

An optical microscope picture of the silver nanowires is shown in FIG. 1. A scanning electron micrograph of the silver nanowires is shown in FIG. 2. Table I shows the average diameter and length of the silver nanowires.

Examples 2-4

The procedure of Example 1 was repeated, while varying the amount of $MnCl_2$ solution that was used. Table I summarizes shows the average diameter and length of the resulting silver nanowires.

Example 5

To a 500 mL reaction flask was added 280 mL ethylene glycol (EG), which was degassed for 2 hrs by bubbling $N_2$ into the solution using a glass pipette at room temperature with mechanical stirring while at 100 rpm. Stock solutions of 0.25 M $AgNO_3$ in EG and 0.77 M polyvinylpyrrolidinone (PVP) in EG were also degassed by bubbling $N_2$ into the solutions overnight. Two syringes where loaded with 20 mL each of the $AgNO_3$ and PVP solutions. Immediately prior to the following heating step, 1.55 g of 11 mM $NbCl_5$ in EG, which was freshly prepared in a glove box under $N_2$, was added to the degassed EG. This reaction mixture was heated to 155° C. under $N_2$ and the $AgNO_3$ and PVP solutions were added at a constant rate over 25 minutes via 12 gauge Teflon syringe needles. The reaction was held at 155° C. for 90 minutes then allowed to cool to room temperature. From the cooled mixture, the reaction mixture was diluted by an equal volume of acetone, and centrifuged at 400 G for 45 minutes. The supernatant was decanted, leaving a solid that was redispersed in 200 mL isopropanol by shaking 10 minutes and centrifuged again, decanted and diluted with 15 mL isopropanol.

Figure 3:
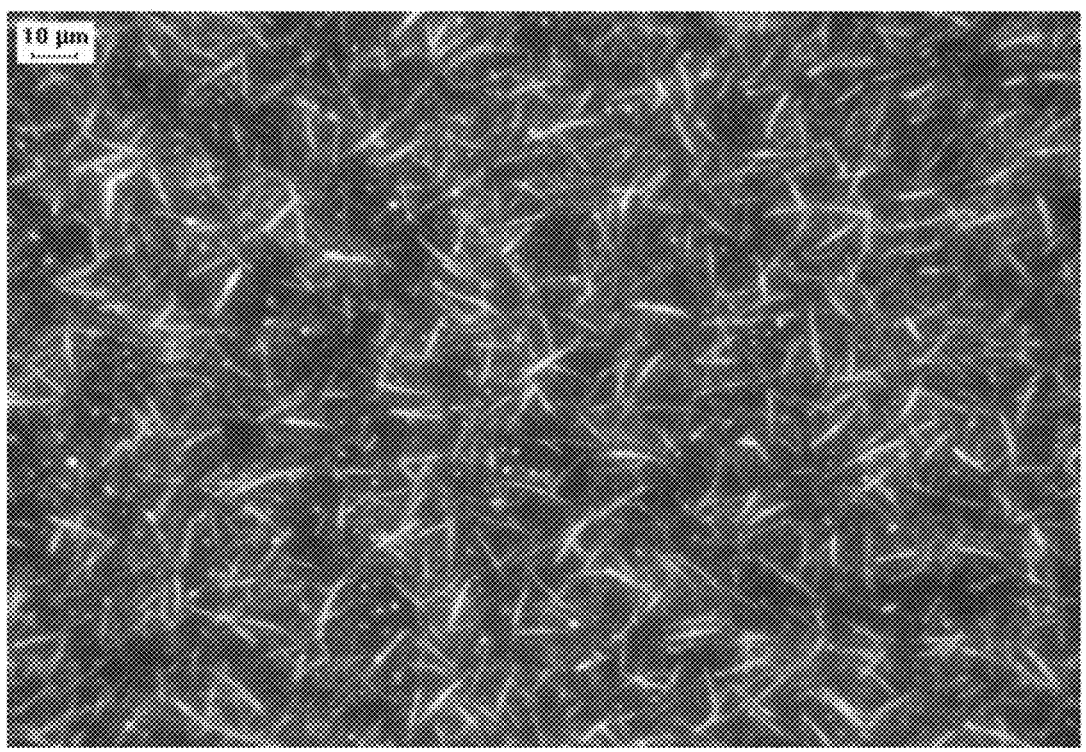
FIG. 3 shows an optical micrograph of the silver nanowire product of Example 5.

An optical microscope picture of the silver nanowires is shown in FIG. 3. The nanowires had an average diameter of 63.4±18.3 nm, based on measurement of at least 100 wires.

Example 6

To a 500 mL reaction flask containing 280 mL ethylene glycol (EG) was added at room temperature 1.30 g of a freshly prepared solution of 9.8 mM $ReCl_3$ in EG, which had been prepared under nitrogen. The resulting mixture was degassed with nitrogen through a glass pipette for 2 hours while stirring at 100 rpm. Solutions of 0.77 M polyvinylpyrrolidinone (PVP) in EG and 0.25 M $AgNO_3$ in EG were also degassed with nitrogen for 60 minutes, then 20 mL syringes of each were prepared. The reaction mixture was heated to 155° C. under nitrogen blanketing, then the $AgNO_3$ and PVP solutions were added at a constant rate over 25 minutes via a 12 gauge a TEFLON® fluoropolymer syringe needle. The reaction was held at 155° C. for 90 minutes, and then allowed to cool to ambient temperature.

Figure 4:
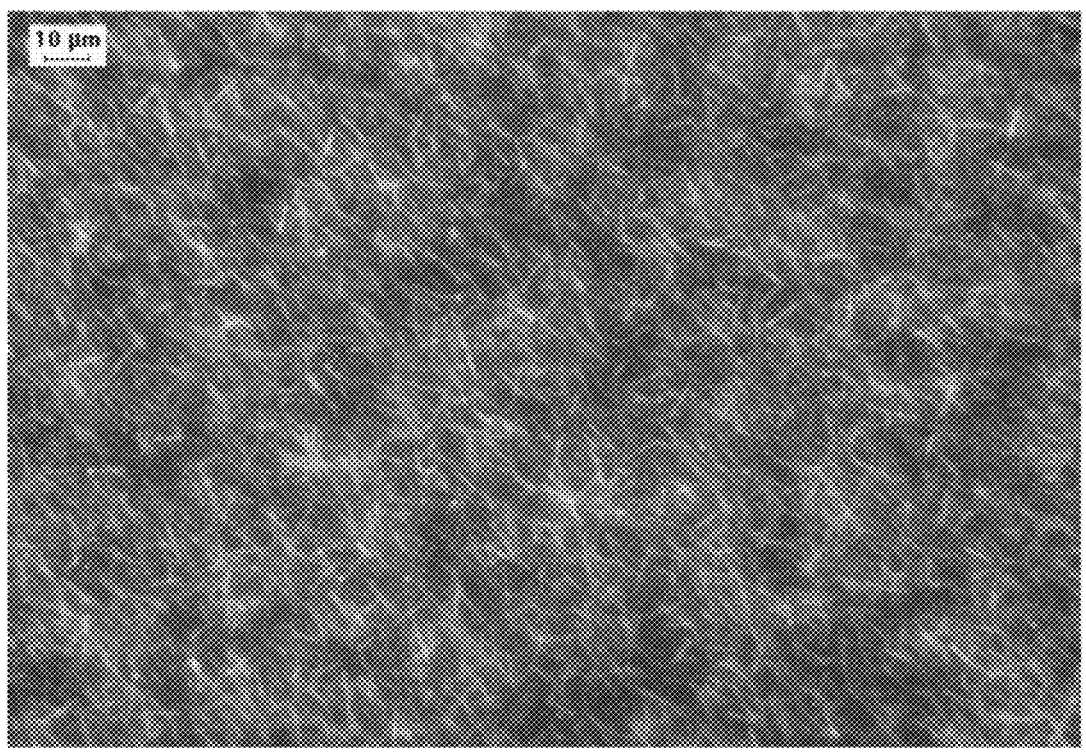
FIG. 4 shows an optical micrograph of the silver nanowire product of Example 6.

An optical microscope picture of the silver nanowire product is shown in FIG. 4.

Example 7

To a 500 mL reaction flask containing 280 mL ethylene glycol (EG) was added 0.74 g of a solution of 27 mM $VCl_3$ in EG at room temperature. This mixture was degassed with nitrogen using a glass pipette while stirring at 100 rpm for 2 hrs. Stock solutions of 0.25 M $AgNO_3$ in EG and 0.77 M polyvinylpyrrolidinone (PVP) in EG were also degassed with nitrogen for 60 min. Two syringes were loaded with 20 mL each of the $AgNO_3$ and PVP solutions. The reaction mixture was heated to 145° C. under $N_2$ and then the $AgNO_3$ and PVP solutions were added at a constant rate over 25 minutes via 12 gauge TEFLON® fluoropolymer syringe needles. The reaction was held at 145° C. for 90 minutes and then allowed to cool to room temperature.

Figure 5:
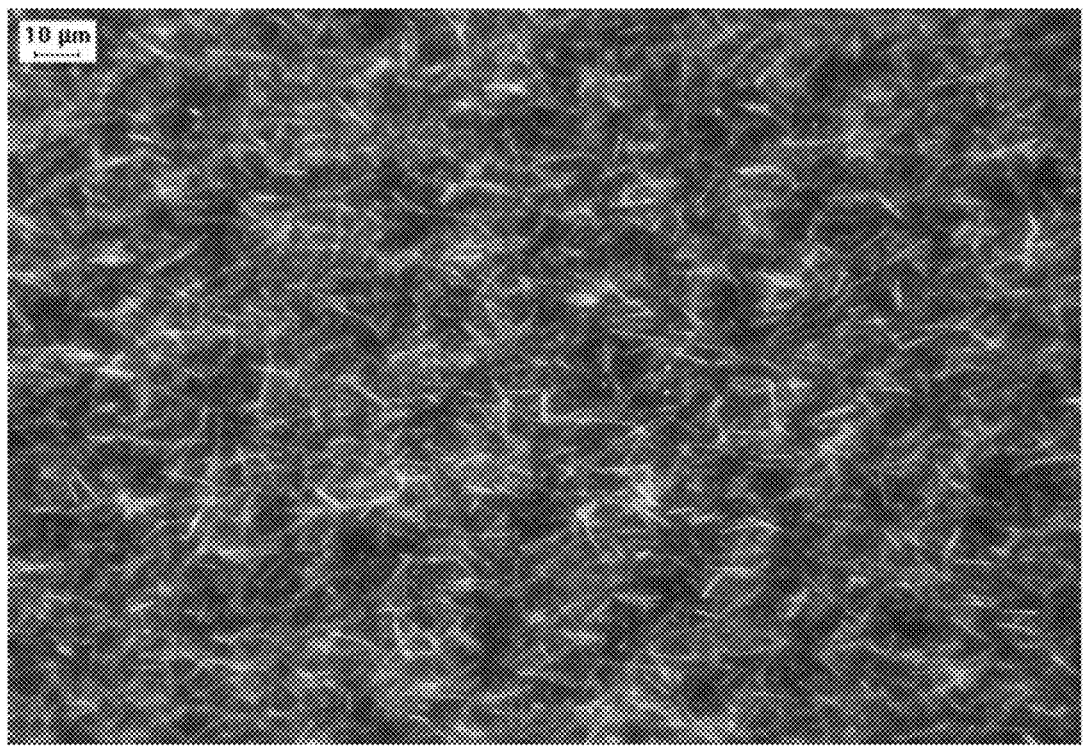
FIG. 5 shows an optical micrograph of the silver nanowire product of Example 7.

An optical micrograph of the silver nanowire product, approximately 10 microns in length, with very few nanoparticles, is shown in FIG. 5. The nanowires had an average diameter of 30.2±18.4 nm, based on measurement of at least 100 wires.

Example 8

To a 500 mL reaction flask containing 280 mL ethylene glycol (EG) was added 1.0 g of a freshly prepared solution of 20 mM $ScCl_2.6H_2O$ in EG. The reaction mixture was degassed for 2 hrs by bubbling $N_2$ into the solution using a glass pipette at room temperature with mechanical stirring at 100 rpm. Stock solutions of 0.25 M $AgNO_3$ in EG and 0.77 M polyvinylpyrrolidinone (PVP) in EG were also degassed by bubbling $N_2$ into the solutions for 60 min. Two syringes were loaded with 20 mL each of the $AgNO_3$ and PVP solutions.

The reaction mixture was heated to 155° C. under $N_2$ and then, after the reaction mixture was held for 10 min, the $AgNO_3$ and PVP solutions were added at a constant rate over 25 minutes via 12 gauge Teflon syringe needles. The reaction was held at 155° C. for 90 minutes and then allowed to cool to room temperature.

Figure 6:
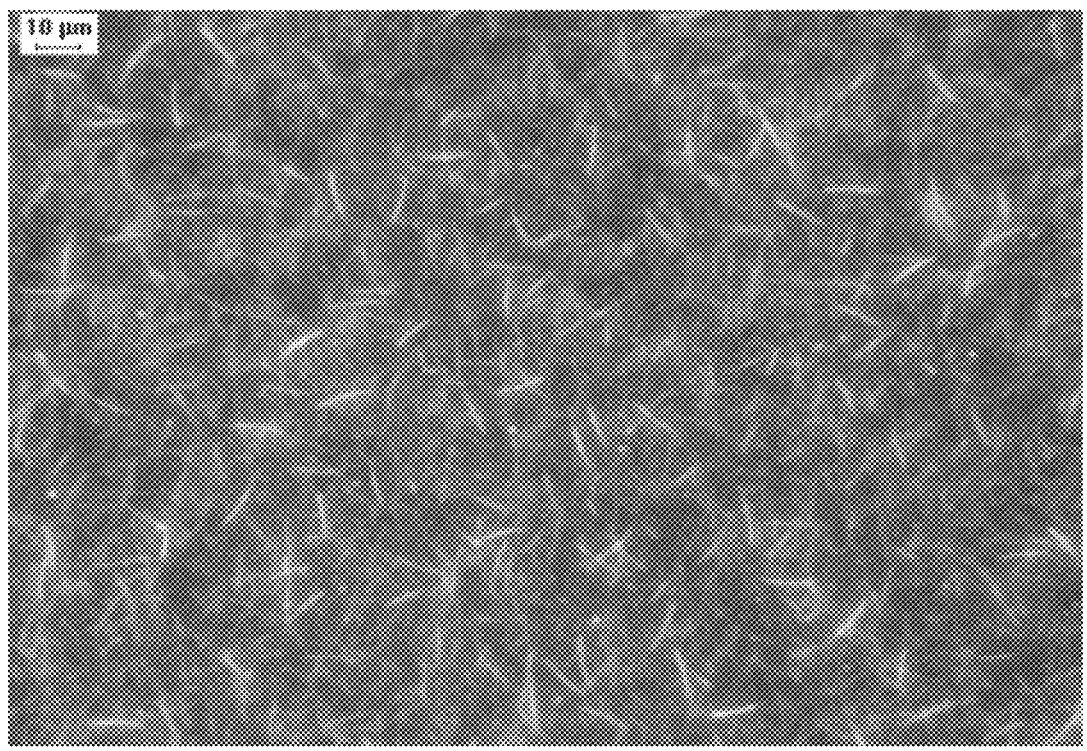
FIG. 6 shows an optical micrograph of the silver nanowire product of Example 8.

An optical micrograph of the silver nanowire product is shown in FIG. 6. There was minimal nanoparticle contamination. The nanowires had an average diameter of 44.1±8.4 nm, based on measurement of at least 100 wires.

Example 9

A 94 mM $TiCl_4$ toluene/ethylene glycol (EG) emulsion was first prepared by mixing 1.0 M $TiCl_4$ in toluene with EG at room temperature under nitrogen with stirring. To a 500 mL reaction flask containing 280 mL EG was added 0.22 g of this emulsion at room temperature. This mixture was degassed with nitrogen while stirring at 100 rpm for 2 hrs. Stock solutions of 0.25 M $AgNO_3$ in EG and 0.77 M polyvinylpyrrolidinone (PVP) in EG were also degassed for 60 min by bubbling $N_2$ into the solutions at room temperature. Two syringes were loaded with 20 mL each of the $AgNO_3$ and PVP solutions. The reaction mixture was heated to 155° C. under $N_2$ and then the $AgNO_3$ and PVP solutions were added at a constant rate over 25 minutes via 12 gauge TEFLON® fluoropolymer syringe needles. The reaction was held at 155° C. for 90 minutes and then allowed to cool to room temperature.

Figure 7:
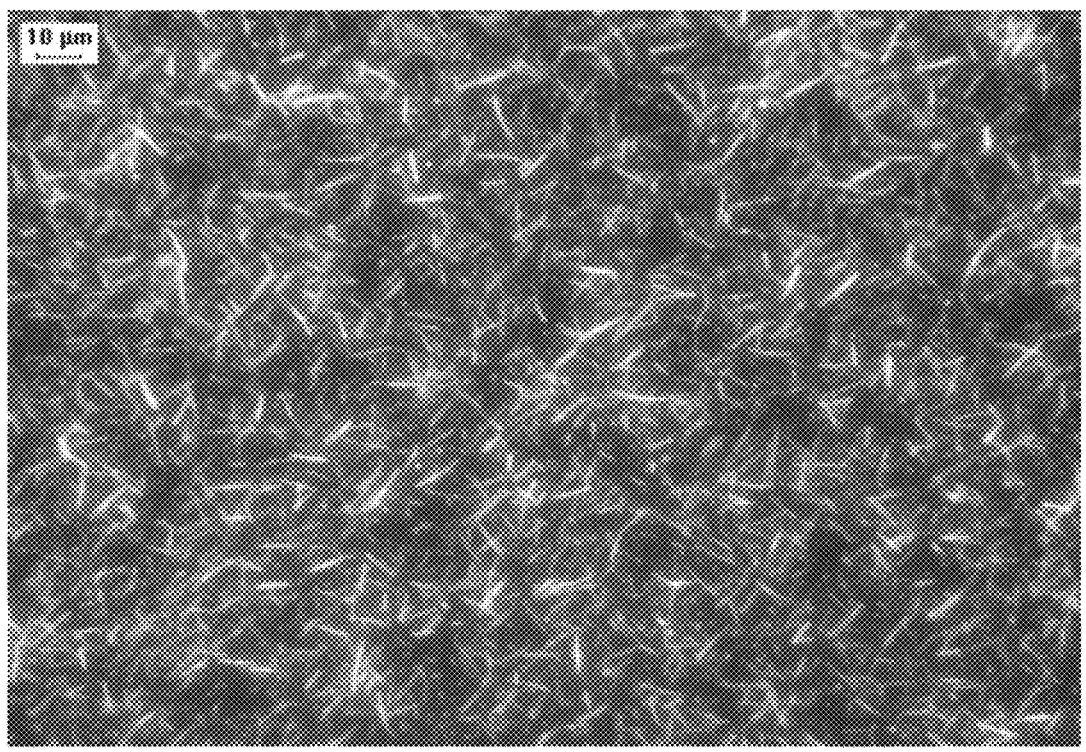
FIG. 7 shows an optical micrograph of the silver nanowire product of Example 9.

An optical micrograph of the silver nanowire product is shown in FIG. 7. The nanowires had an average diameter of 32±16 nm, based on measurement of at least 100 wires.

Example 10

A 500 mL reaction flask containing 280 mL ethylene glycol (EG) was degassed overnight using nitrogen introduced using a sub-surface TEFLON® fluoropolymer tube. To the flask as then added 0.82 g of a freshly prepared 22 mM solution of molybdenum (IV) dichloride dioxide in EG. The fluoropolymer tube was then retracted to provide nitrogen blanketing at a flow rate of approximately 0.5 L/min. The reaction mixture was heated to 145° C. while stirring at 100 rpm. Solutions of 0.84 M polyvinylpyrrolidinone (PVP) in EG and 0.25 M $AgNO_3$ in EG were degassed with nitrogen, then 20 mL syringes of each were prepared. The $AgNO_3$ and PVP solutions were then added at a constant rate over 25 minutes via a 12 gauge TEFLON® fluoropolymer syringe needle. The reaction was held at 145° C. for 90 minutes then allowed to cool to ambient temperature.

Figure 8:
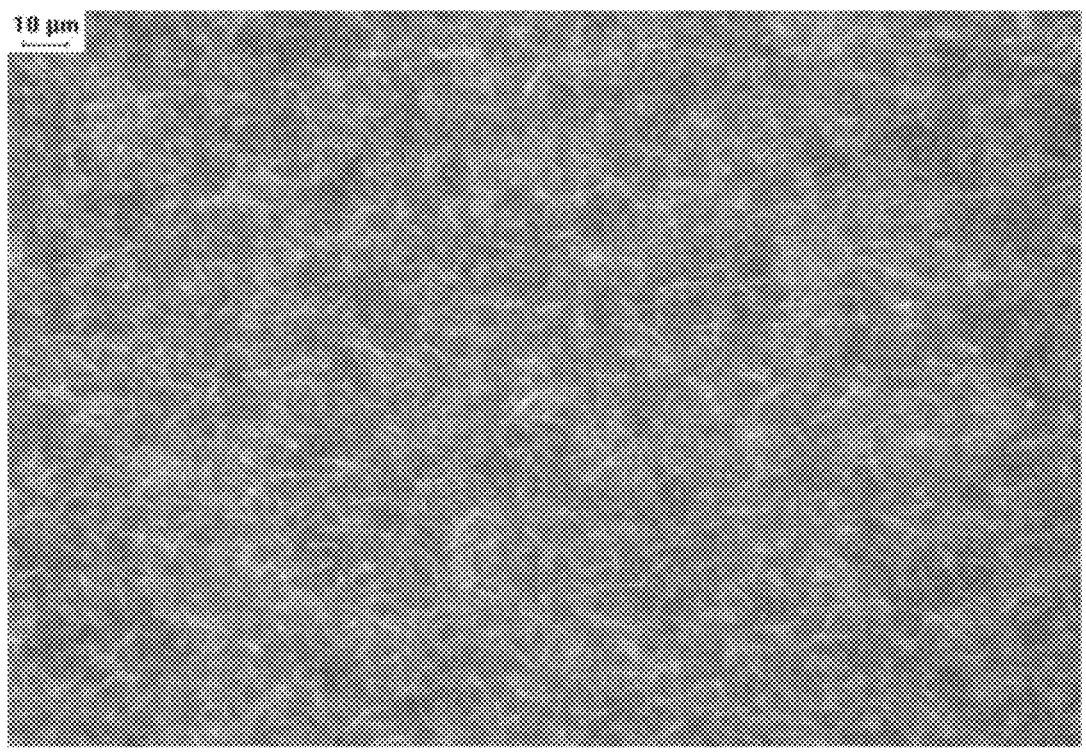
FIG. 8 shows an optical micrograph of the silver nanowire product of Example 10, at 45 min reaction time.
Figure 9:
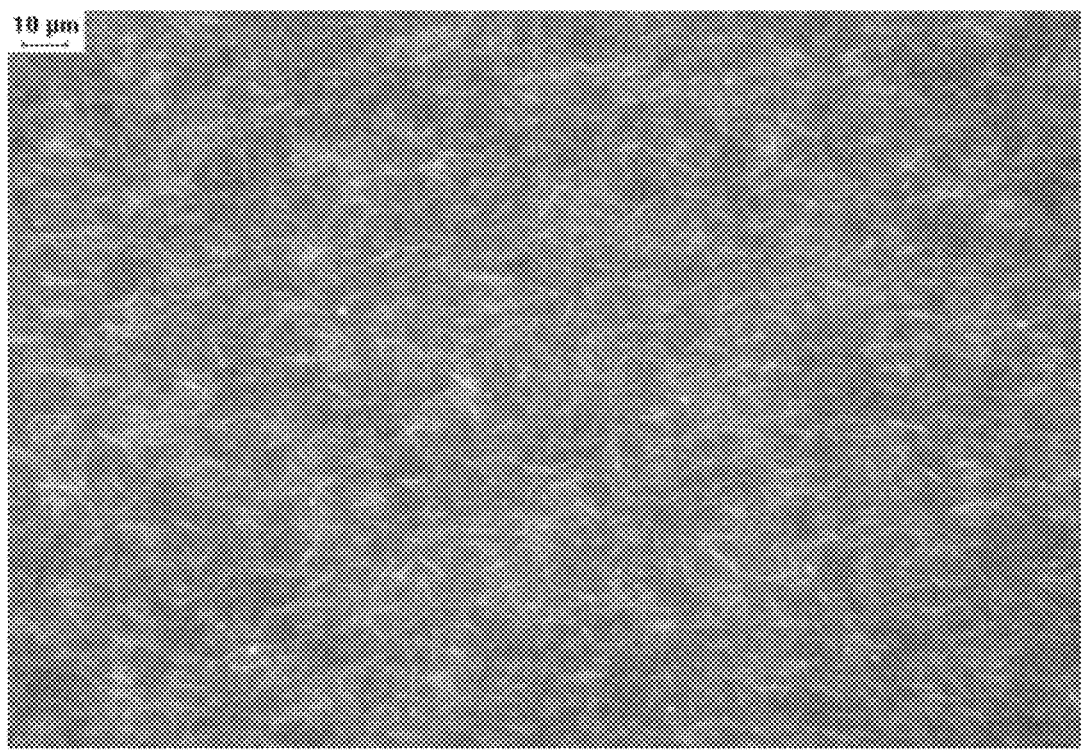
FIG. 9 shows an optical micrograph of the silver nanowire product of Example 10, at 60 min reaction time.

An optical microscope picture of the silver nanowire product at 45 min reaction time is shown in FIG. 8. FIG. 9 shows the product at 60 min reaction time.

Example 11

To a 500 mL reaction flask containing 280 mL ethylene glycol (EG), 3.3 g of a 5.9 mM solution of tungsten (IV) chloride in EG was added at room temperature. The mixture was agitated at 100 rpm and degassed with nitrogen using a glass pipette for 2 hrs. Stock solutions of 0.25 M $AgNO_3$ in EG and 0.77 M polyvinylpyrrolidinone (PVP) in EG were also degassed with nitrogen for 60 min, then 20 mL syringes of each were prepared. The flask was then heated to 145° C. while degassing by bubbling nitrogen through its contents. The $AgNO_3$ and PVP solutions were then added at a constant rate over 25 min via a 12 gauge a TEFLON® fluoropolymer syringe needle. The flask was then held at temperature for 60 min, after which it was allowed to cool down to ambient temperature.

Figure 10:
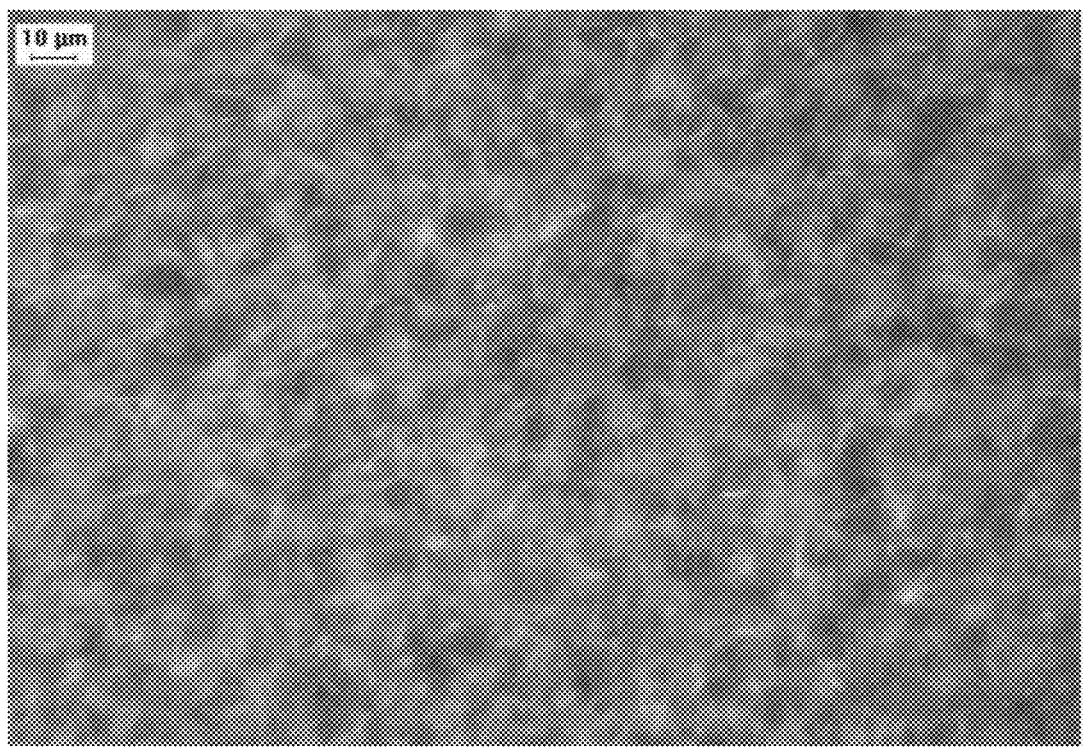
FIG. 10 shows an optical micrograph of the silver nanowire product of Example 11.

The reaction product was diluted with an equal volume of acetone, then centrifuged at 500 G for 45 min. The supernatant was decanted, leaving a solid that was redispersed in 200 mL isopropanol by shaking 10 min, and then centrifuged, decanted, and redispersed in 15 mL isopropanol. An optical micrograph of the silver nanowire product is shown in FIG. 10. The nanowires had an average diameter of 54.4±12.6 nm, based on measurement of at least 100 wires.

Example 12

To a 500 mL reaction flask containing 280 mL ethylene glycol (EG), 1.0 g of a 7.8 mM solution of chromium (III) chloride hexahydrate in EG was added at room temperature. The mixture was agitated at 100 rpm and degassed with nitrogen using a glass pipette for 2 hrs. Stock solutions of 0.25 M AgNO$_3$ in EG and 0.77 M polyvinylpyrrolidinone (PVP) in EG were also degassed with nitrogen for 60 min, then 20 mL syringes of each were prepared. The flask was then heated to 145° C. while degassing by bubbling nitrogen through its contents. The AgNO$_3$ and PVP solutions were then added at a constant rate over 25 min via a 12 gauge a TEFLON® fluoropolymer syringe needle. The flask was then held at temperature for 90 min, after which it was allowed to cool down to ambient temperature.

Figure 11:
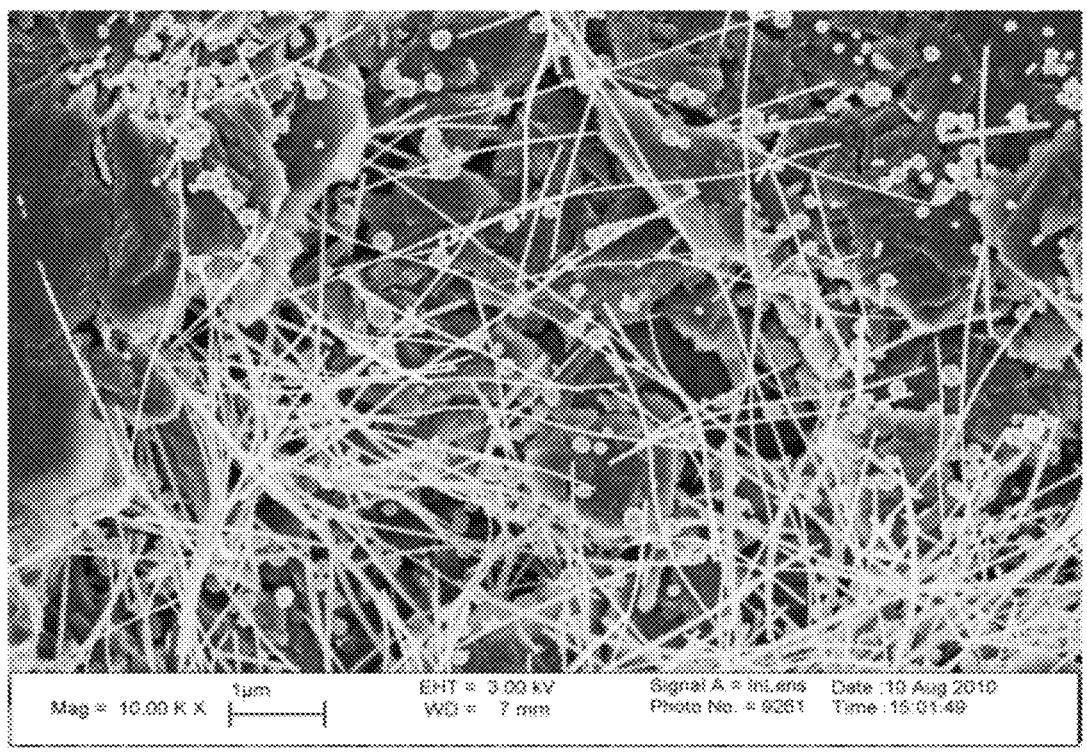
FIG. 11 shows an optical micrograph of the silver nanowire product of Example 12.

The reaction product was diluted with an equal volume of acetone, then centrifuged at 500 G for 45 min. The supernatant was decanted, leaving a solid that was redispersed in 200 mL isopropanol by shaking 10 min, and then centrifuged, decanted, and redispersed in 15 mL isopropanol. A scanning electron micrograph of the silver nanowire product is shown in FIG. 11. The silver nanowires had an average diameter of 47±14 nm.

Example 13

A 500 mL reaction flask containing 280 mL ethylene glycol (EG) was agitated at 100 rpm and degassed overnight at room temperature using nitrogen that was introduced below the liquid surface through a TEFLON® fluoropolymer tube. Afterwards, 15 mg of lanthanum (III) chloride heptahydrate was added to the reaction flask. Stock solutions of 0.25 M AgNO$_3$ in EG and 0.84 M polyvinylpyrrolidinone (PVP, 55,000 weight-average molecular weight) in EG were also degassed with nitrogen for 60 min, then 20 mL syringes of each were prepared. The flask was then heated to 145° C. while blanketing the reaction flask headspace with nitrogen. The AgNO$_3$ and PVP solutions were then added at a constant rate over 25 min via a 12 gauge a TEFLON® fluoropolymer syringe needle. The flask was then held at temperature for 90 min, after which it was allowed to cool down to ambient temperature.

Figure 12:
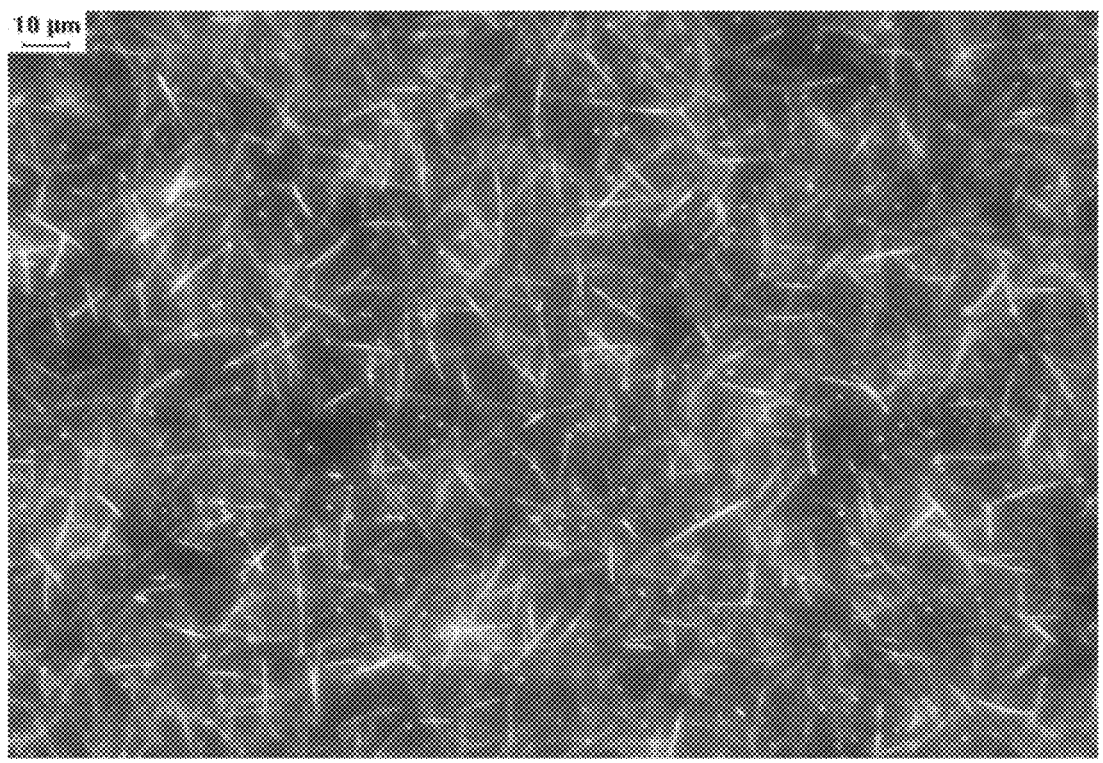
FIG. 12 shows an optical micrograph of the silver nanowire product of Example 13.

FIG. 12 shows a 400-power optical micrograph of the silver nanowire product, which had an average nanowire diameter of 58.3±27.8 nm, where the indicated average diameter and standard deviation were calculated from measurements of at least 100 wires.

Example 14

Figure 13:
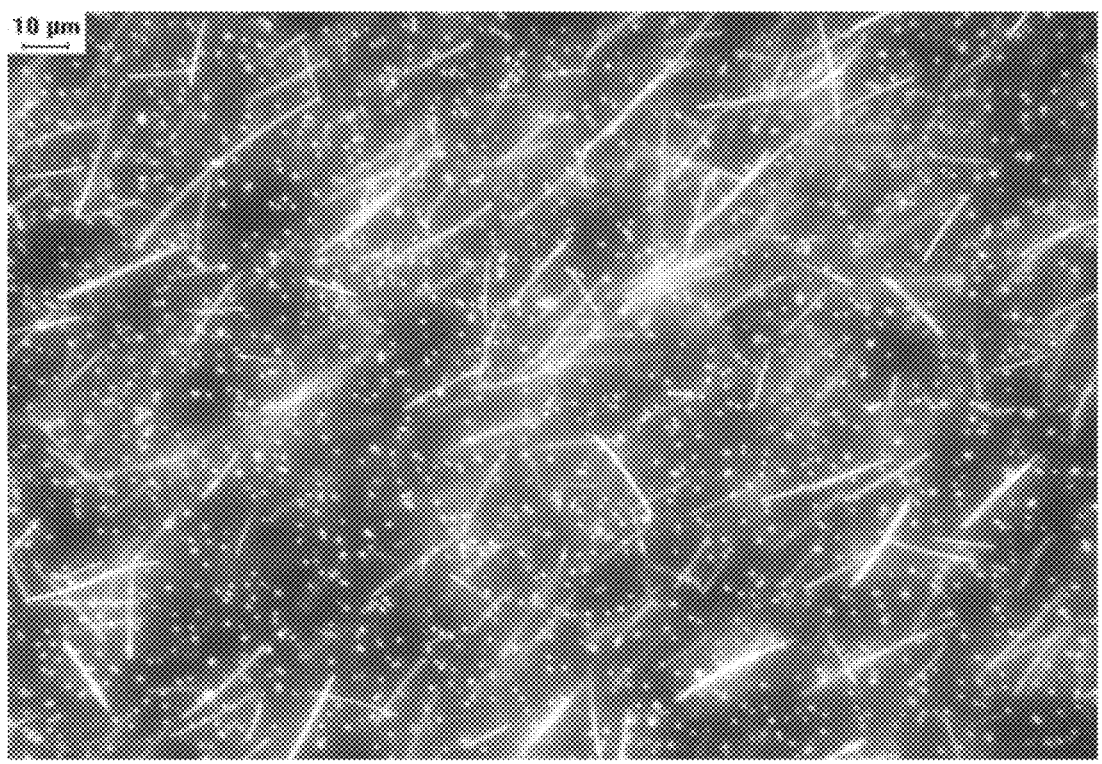
FIG. 13 shows an optical micrograph of the silver nanowire product of Example 14.

The procedure according to Example 13 was repeated, except that 59 mg of lanthanum (III) chloride heptahydrate was used and the reaction was carried out for 150 min before cooling. FIG. 13 shows a 400-power optical micrograph of the silver nanowire product, which had an average nanowire diameter of 88.2±33.8 nm.

Example 15

A 500 mL reaction flask containing 280 mL ethylene glycol (EG), 2.4 g polyvinylpyrrolidinone (PVP, 55,000 weight-average molecular weight), and 7.1 mg of yttrium (III) chloride hexahydrate was degassed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the flask was then heated to 145° C. A stock solution of 0.50 M AgNO$_3$ in EG was also degassed with nitrogen, then a 40 mL syringe of the solution was prepared. The AgNO$_3$ solution was then added at a constant rate over 25 min via a 12 gauge TEFLON® fluoropolymer syringe needle. The flask was then held at temperature for 60 min, after which it was allowed to cool down to ambient temperature.

Figure 14:
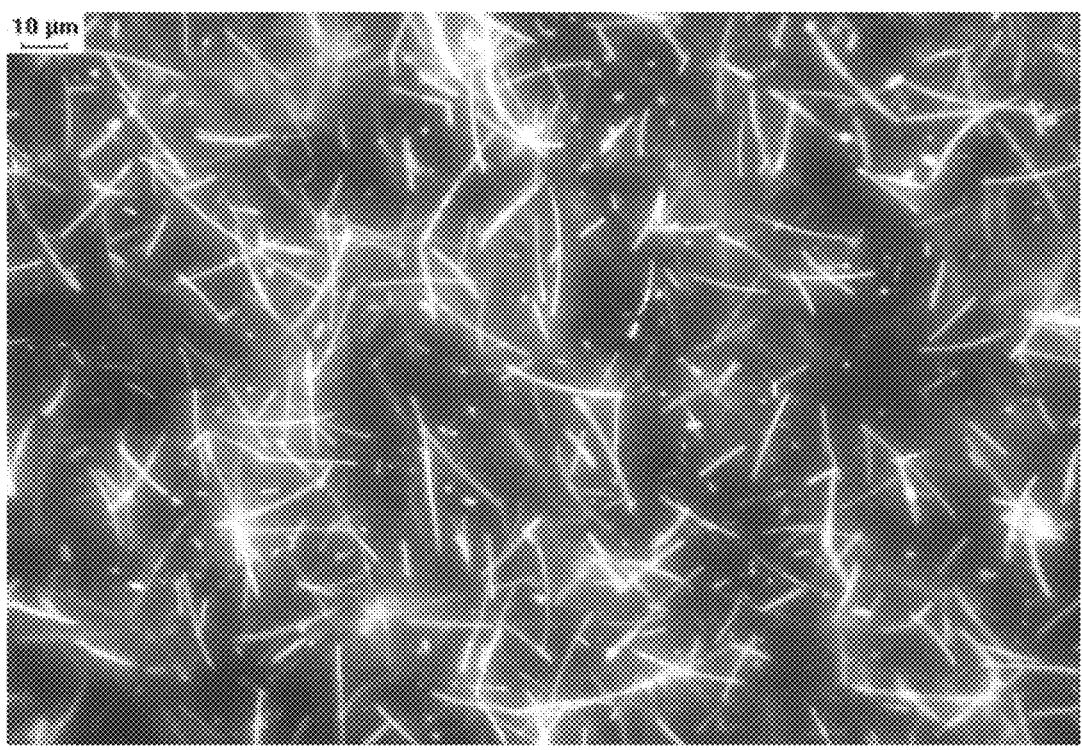
FIG. 14 shows an optical micrograph of the silver nanowire product of Example 15.
Figure 15:
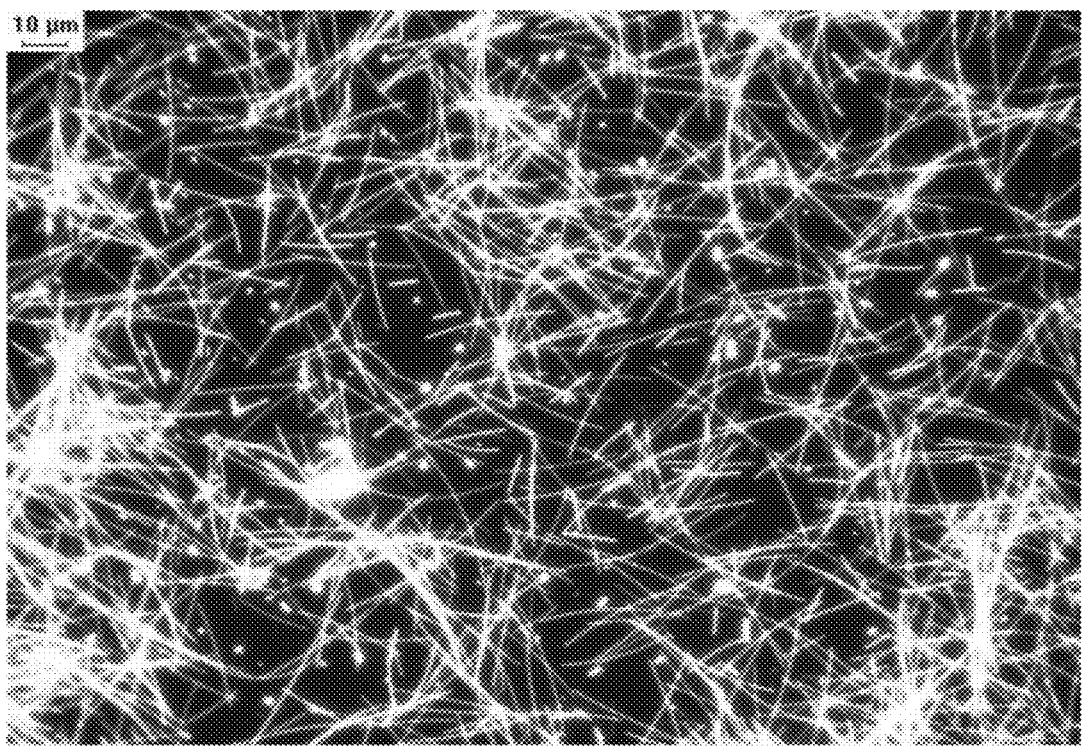
FIG. 15 shows an optical micrograph of the silver nanowire product of Example 15.

FIGS. 14 and 15 show optical micrographs of the silver nanowire product. The nanowires had an average diameter of 88.9±17.1 nm, based on measurement of at least 100 wires.

Example 16

Figure 16:
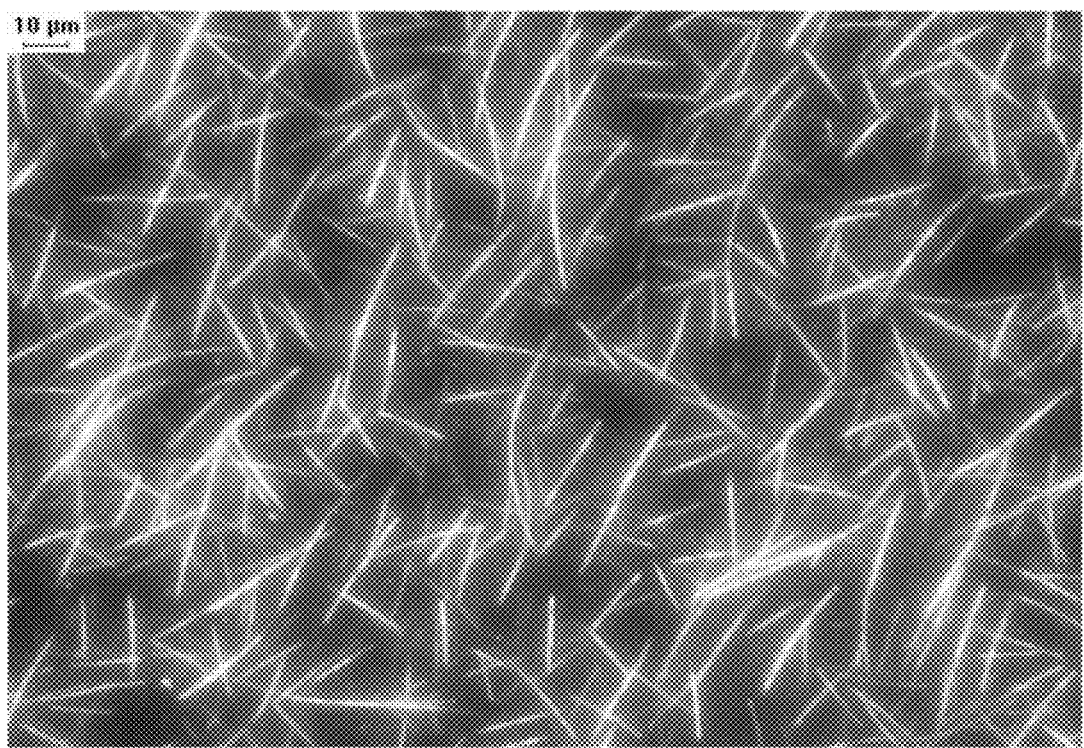
FIG. 16 shows an optical micrograph of the silver nanowire product of Example 16.
Figure 17:
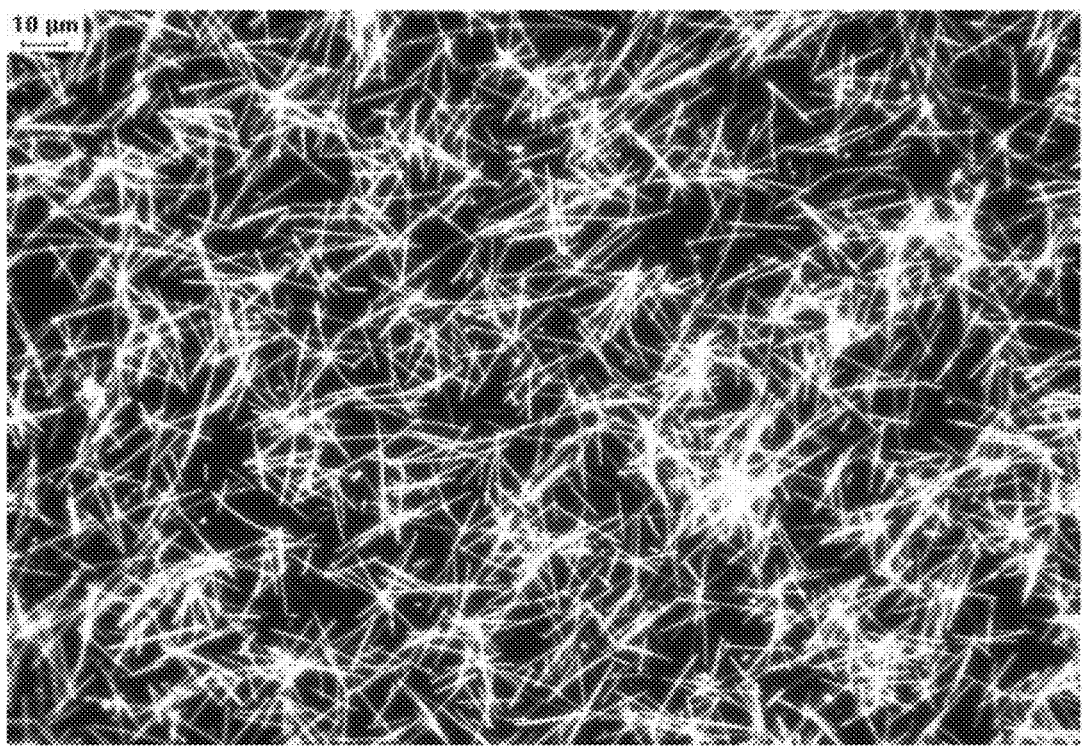
FIG. 17 shows an optical micrograph of the silver nanowire product of Example 16.

The procedure of Example 15 was repeated using 3.3 mg 7.1 mg of yttrium (III) chloride hexahydrate. FIGS. 16 and 17 show optical micrographs of the silver nanowire product. The nanowires had an average diameter of 89.4±18.7 nm, based on measurement of at least 100 wires.

Example 17

A 500 mL reaction flask containing 300 mL ethylene glycol (EG), 2.2 g polyvinylpyrrolidinone (PVP, 55,000 weight-average molecular weight), and 9.2 mg of hafnium tetrachloride bis(tetrahydrofuran) adduct, was degassed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the agitated flask was then heated to 145° C. A stock solution of 0.50 M AgNO$_3$ in EG was also degassed with nitrogen, and then a 20 mL syringe of the degassed solution was prepared. The AgNO$_3$ solution was then added at a constant rate over 25 min via a 12 gauge TEFLON® fluoropolymer syringe needle. The flask was then held at temperature for 60 min, after which it was allowed to cool down to ambient temperature.

Figure 18:
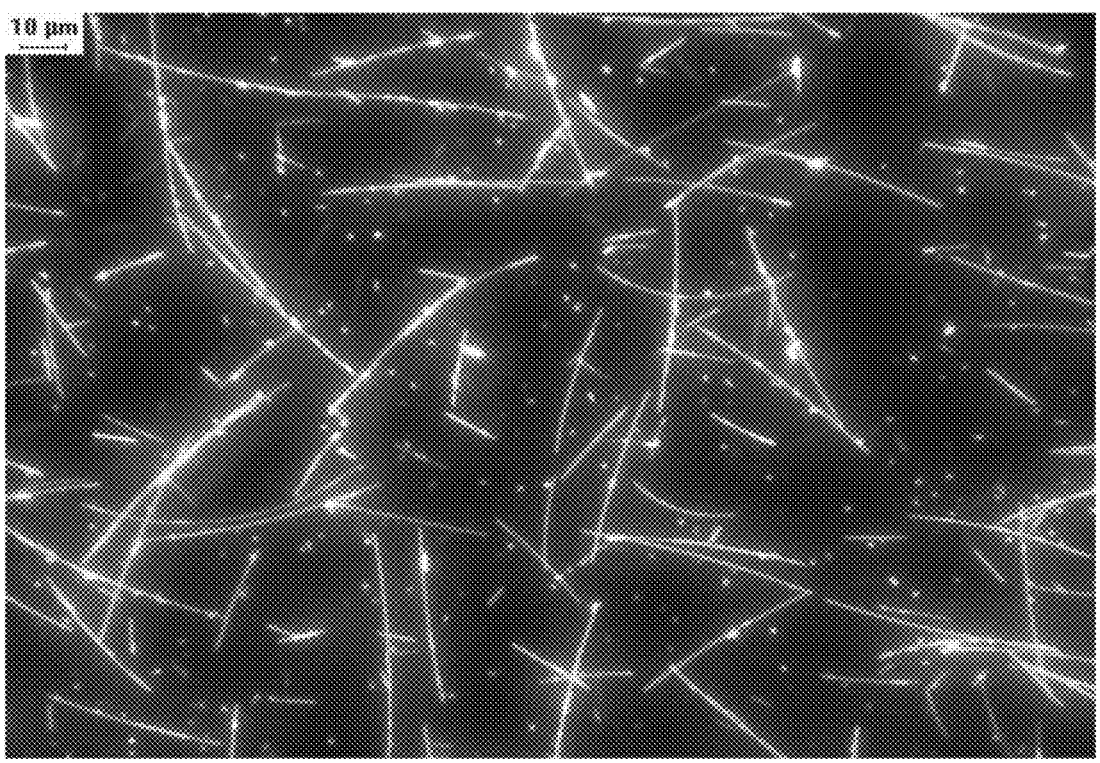
FIG. 18 shows an optical micrograph of the silver nanowire product of Example 17.

FIG. 18 shows an optical micrograph of the nanowire product, which had an average diameter of 253.5±133.0 nm and an average length of 8.7±5.5 μm, based on measurement of 100 wires.

Example 18

Figure 19:
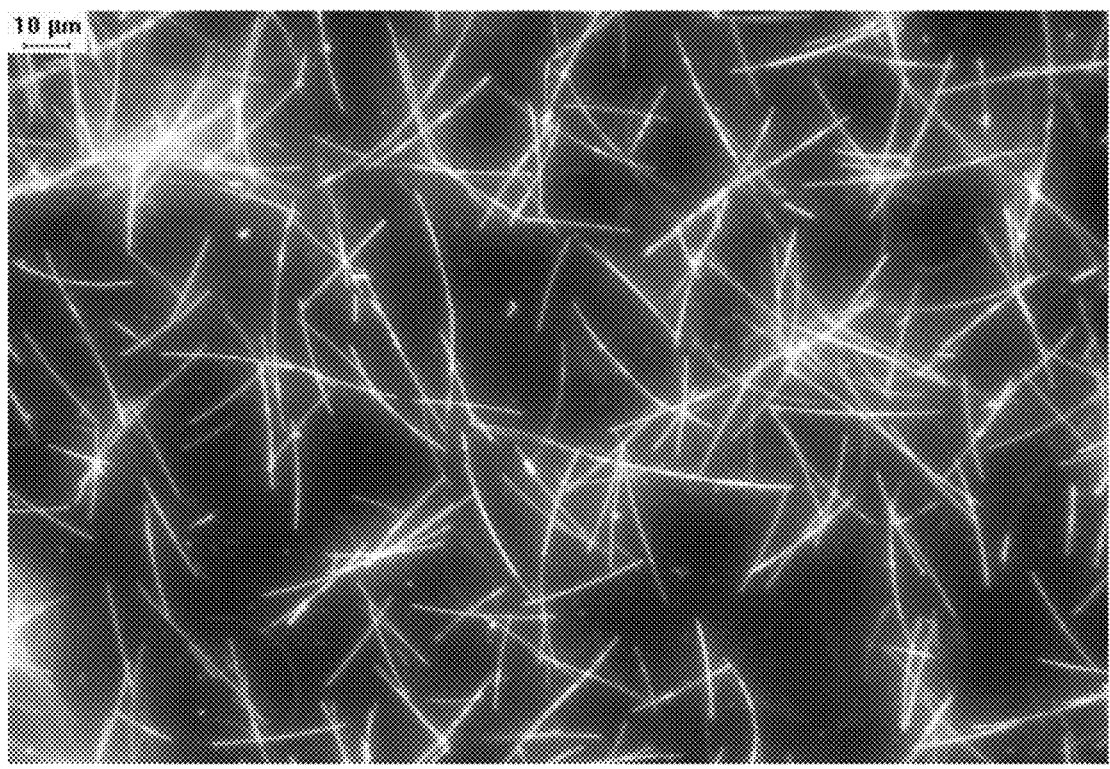
FIG. 19 shows an optical micrograph of the silver nanowire product of Example 18.

The procedure of Example 17 was repeated using 6.9 mg of zirconium tetrachloride bis(tetrahydrofuran) adduct in place of the hafnium-containing adduct. FIG. 19 shows an optical micrograph of the silver nanowire product, which had an average diameter of 147.3±50.0 nm and an average length of 15.6±12.0 μm, based on measurement of 100 wires.

Example 19

A 500 mL reaction flask containing 300 mL ethylene glycol (EG), 2.2 g polyvinylpyrrolidinone (PVP, 55,000 weight-average molecular weight), and 4.3 mg of tantalum (V) chloride, was degassed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the agitated flask was then heated to 145° C. A stock solution of 0.50 M $AgNO_3$ in EG was also degassed with nitrogen, and then a 20 mL syringe of the degassed solution was prepared. The $AgNO_3$ solution was then added at a constant rate over 25 min via a 12 gauge TEFLON® fluoropolymer syringe needle. The flask was then held at temperature for 60 min, after which it was allowed to cool down to ambient temperature.

Figure 20:
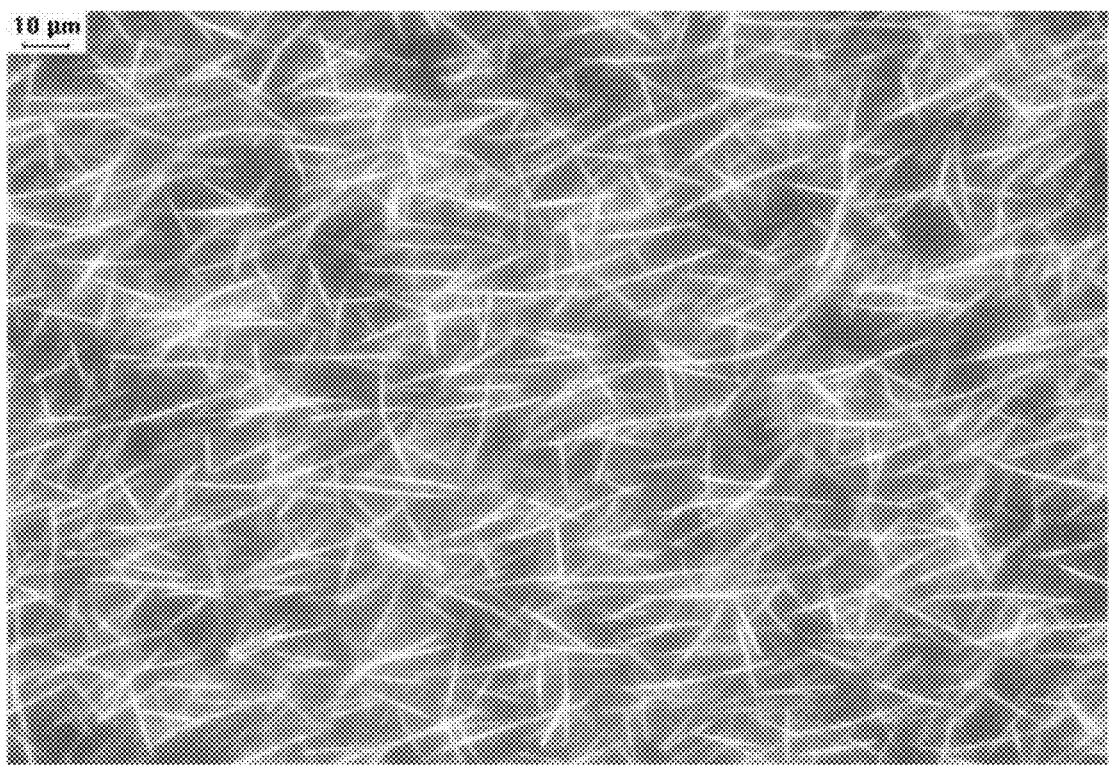
FIG. 20 shows an optical micrograph of the silver nanowire product of Example 19.

FIG. 20 shows an optical micrograph of the nanowire product, which had an average diameter of 83.1±11.9 nm and an average length of 13.2±3.6 μm, based on measurement of 100 wires.

Example 20

Figure 21:
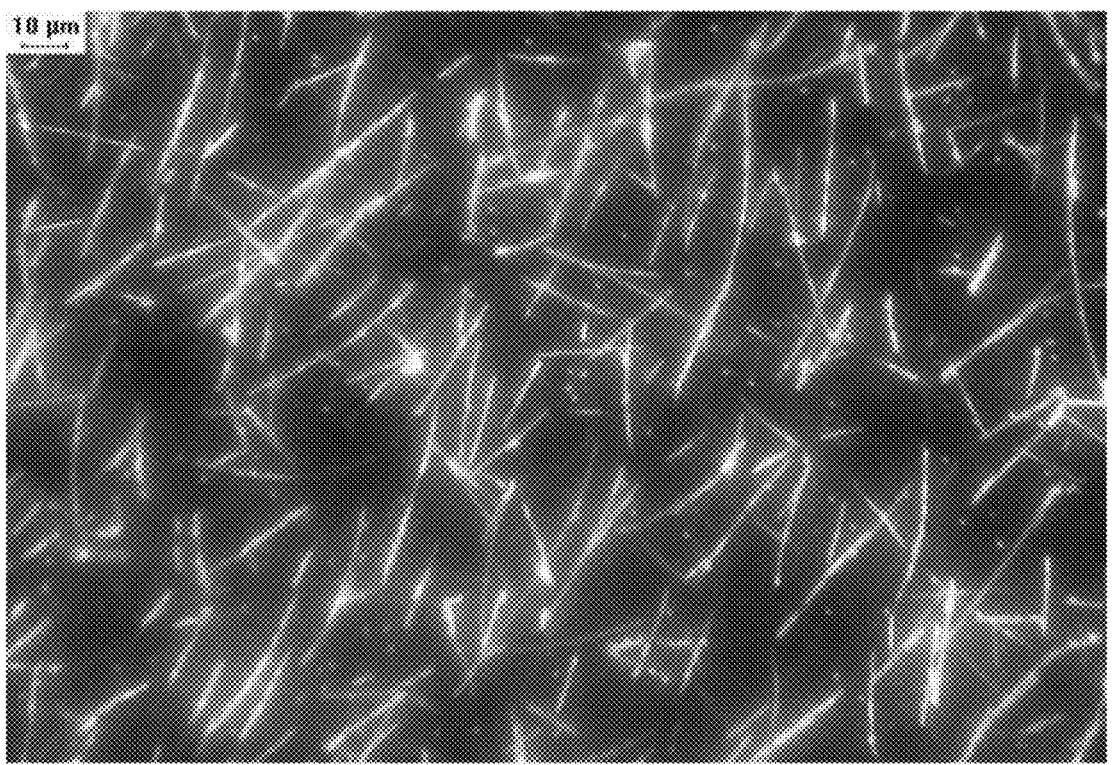
FIG. 21 shows an optical micrograph of the silver nanowire product of Example 20.

The procedure of Example 19 was repeated using 9.9 mg of tantalum (V) chloride. FIG. 21 shows an optical micrograph of the silver nanowire product, which had an average diameter of 215±119 nm and an average length of 10.6±6.5 μm, based on measurement of 100 wires.

Example 21

Comparative

A 500 mL reaction flask containing 200 mL ethylene glycol (EG), 1.28 mL of a 0.006 M solution of $FeCl_2$ in ethylene glycol (EG) was degassed using a subsurface glass pipette. The agitated flask was then heated to 135° C., continuing the nitrogen bubbling for 1 hr, followed by nitrogen blanketing of the headspace thereafter. Stock solutions of 0.094 M $AgNO_3$ in EG and 0.282 M polyvinylpyrrolidone (PVP) in EG were also degassed with nitrogen. 60 mL syringes of the degassed $AgNO_3$ and PVP solutions were then prepared and then added at a constant rate over 10 min via a 12 gauge TEFLON® fluoropolymer syringe needle. The flask was then held at temperature for 2.5 hr, after which it was quenched in an ice bath to cool to room temperature.

The resulting nanowires had an average diameter of 121±27 nm, based on measurement of at least 100 wires.

Example 22

Comparative

A 500 mL reaction flask containing 300 mL ethylene glycol (EG), 2.2 g polyvinylpyrrolidinone (PVP, 55,000 weight-average molecular weight), and 1.4 g of a 6.9 mM solution of tin (II) chloride in EG, was degassed for 2 hrs at room temperature using nitrogen that was introduced below the liquid surface through a glass pipette. The tube was then retracted from the liquid to provide nitrogen blanketing of the reaction flask headspace, after which the agitated flask was then heated to 145° C. Stock solutions of 0.28 M $AgNO_3$ in EG and 0.84 M PVP in EG were also degassed with nitrogen, and then 20 mL syringes of the degassed solutions were prepared. The $AgNO_3$ and PVP solutions were then added at a constant rate of 0.8 mL/min via a 12 gauge TEFLON® fluoropolymer syringe needle. The flask was then held at temperature for 120 min, after which it was allowed to cool down to ambient temperature.

The resulting nanowires had an average diameter of 75.9±17.1 nm and an average length of 7.4±3.3 μm, based on measurement of at least 100 wires.

Example 23

The procedure of Example 19 was repeated, using 18.7 mg of hafnium tetrachloride bis(tetrahydrofuran) adduct in place of the tantalum (V) chloride. The resulting nanowire product had an average diameter of 238.1±102.7 nm and an average length of 11.0±7.6 μm, based on measurement of 100 wires.

Example 24

The procedure of Example 19 was repeated, using 16.2 mg of, zirconium tetrachloride bis(tetrahydrofuran) adduct in place of the tantalum (V) chloride. The resulting nanowire product had an average diameter of 241±95 nm and an average length of 10.4±6.6 μm, based on measurement of 100 wires.

The invention has been described in detail with reference to particular embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced within.

TABLE I

| ID | Mole Ratio $Mn^{2+}:Ag^+$ | Average Diameter (nm) | Average Length (micron) |
| --- | --- | --- | --- |
| Example 1 | 1:632 | 63 ± 15 | 6.3 ± 2.0 |
| Example 2 | 1:213 | 55 ± 15 | 9.0 ± 4.0 |
| Example 3 | 1:93 | 60 ± 14 | 11 ± 5.0 |
| Example 4 | 1:213 | 25 ± 15 | 10.6 ± 3.7 |

What is claimed:
1. A method comprising:
providing at least one composition comprising at least one first silver ion and at least one metal oxide halide compound comprising at least one second metal or metal ion comprising at least one element or ion of an element from the International Union of Pure and Applied Chemists (IUPAC) Group 3, the International Union of Pure and Applied Chemists (IUPAC) Group 4, the International Union of Pure and Applied Chemists (IUPAC) Group 5, the International Union of Pure and Applied Chemists (IUPAC) Group 6, or the International Union of Pure and Applied Chemists (IUPAC) Group 7, the at least one second metal or metal ion differing in atomic number from the at least one first silver ion; and
reducing the at least one first silver ion to at least one silver metal nanowire, wherein the at least one silver metal nanowire has a length greater than 10 microns.

2. The method according to claim 1, wherein the at least one second metal or metal ion has an oxidation state of +4 or greater.

3. The method according to claim 1, wherein the at least one second metal or metal ion comprises at least one element or ion of an element from IUPAC Group 3.

4. The method according to claim 1, wherein the at least one second metal or metal ion comprises at least one element f or ion of an element from IUPAC Group 4.

5. The method according to claim 1, wherein the at least one second metal or metal ion comprises at least one element or ion of an element from IUPAC Group 5.

6. The method according to claim 1, wherein the at least one second metal or metal ion comprises at least one element or ion of an element from IUPAC Group 6.

7. The method according to claim 1, wherein the at least one second metal or metal ion comprises at least one element or ion of an element from the International Union of Pure and Applied Chemists (IUPAC) Group 7.

8. The method according to claim 1, wherein the at least one silver metal nanowire has a diameter between 10 nm and 300 nm.

\* \* \* \* \*